United States Patent
Schilling et al.

(10) Patent No.: US 8,299,172 B2
(45) Date of Patent: Oct. 30, 2012

(54) BIODEGRADABLE PLASTICS

(75) Inventors: Christopher H. Schilling, Midland, MI (US); David S. Karpovich, Gagetown, MI (US); Piotr Tomasik, Cracow (PL)

(73) Assignee: Saginaw Valley State University, University Center, MI (US)

( * ) Notice: Subject to any disclaimer, the term of this patent is extended or adjusted under 35 U.S.C. 154(b) by 870 days.

(21) Appl. No.: 12/008,781

(22) Filed: Jan. 14, 2008

(65) Prior Publication Data

US 2008/0167436 A1 Jul. 10, 2008

Related U.S. Application Data

(63) Continuation-in-part of application No. 10/457,281, filed on Jun. 9, 2003, now abandoned.

(51) Int. Cl.
  *C08H 1/00* (2006.01)
  *C08L 1/02* (2006.01)
  *C08L 97/02* (2006.01)

(52) U.S. Cl. .................. 525/54.1; 525/54.2; 525/54.21; 525/54.24; 525/54.3; 525/54.31

(58) Field of Classification Search ................ 525/54.1, 525/54.2, 52.21, 54.24, 54.3, 54.31
See application file for complete search history.

(56) References Cited

U.S. PATENT DOCUMENTS

| | | | |
|---|---|---|---|
| 2,524,024 A * | 9/1950 | Swinehart et al. | 536/85 |
| 5,166,336 A | 11/1992 | Yamauchi et al. | |
| 5,397,834 A | 3/1995 | Jane et al. | |
| 5,523,293 A | 6/1996 | Jane et al. | |
| 5,593,625 A | 1/1997 | Riebel et al. | |
| 5,665,152 A | 9/1997 | Bassi et al. | |
| 5,710,190 A | 1/1998 | Jane et al. | |
| 5,792,602 A * | 8/1998 | Maskasky et al. | 430/569 |
| 5,852,114 A | 12/1998 | Loomis et al. | |
| 6,103,885 A | 8/2000 | Batelaan et al. | |
| 7,225,732 B2 | 8/2007 | Fischer et al. | |

OTHER PUBLICATIONS

Reply filed by the Applicants in U.S. Appl. No. 10/457,281 on Jan. 10, 2006.*

* cited by examiner

*Primary Examiner* — Irina S Zemel
(74) *Attorney, Agent, or Firm* — Bruce M. Kanuch

(57) ABSTRACT

A method for producing biodegradable plastic from natural materials containing polysaccharides by treating the polysaccharide-containing materials with a basic aqueous solution, subsequently treating the mixture with a modifying material that converts pendant hydroxyl groups at any carbon atom of the anhydroglucose units of the saccharide to create polysaccharide carboxylate, and then reacting the product with proteins to produce a biodegradable copolymer with electrostatic chemical bonds between protein and polysaccharide carboxylate molecules. The process provides relatively inexpensive methods for preparing biodegradable plastics that are useful for manufacturing various articles.

13 Claims, 12 Drawing Sheets

BIODEGRADABLE PLASTICS

This application is a Continuation-in-Part of U.S. Ser. No. 10/457,281, filed Jun. 9, 2003 now abandoned from which this application claims priority.

The invention disclosed and claimed herein deals with methods of preparing biodegradable plastics and the biodegradable plastics per se.

The essence of this invention is to provide relatively inexpensive methods for preparing biodegradable protein— polysaccharide composite materials that are useful for manufacturing various articles and also to provide an environmental solution that will reduce the amount of natural wastes that could be practically utilized for the benefit of mankind, rather than having to place such wastes in a landfill or otherwise having to dispose of them.

BACKGROUND OF THE INVENTION

The World has been blessed with the capability of providing various products that benefit mankind such as foods for human consumption, beverages, animal feeds, building materials, and the like. A downside to this blessing is the fact that, in the manufacture of these materials, large amounts of waste are created, and typically, these wastes are burned or buried in order to dispose of them. It now becomes environmentally and economically necessary to consider ways in which these wastes can be removed and at the same time, create products or byproducts that can be recycled back into commerce or can otherwise be beneficial to mankind.

For economical and environmental reasons, recent studies focus on utilization of natural materials, either in the natural state, or as a waste stream from the processing of natural materials, as renewable, versatile, biodegradable resources for the production of novel materials. Polysaccharides are major constituents of these natural materials. With the term "polysaccharide" it is meant a pure carbohydrate, such as starch or cellulose, whereas "polysaccharide-based material" refers to materials containing a polysaccharide as major component, such as pulp, the major component of which is alpha-cellulose. Hereinafter both alternatives will be meant, if not stated otherwise, when using the wording "polysaccharide". Polysaccharides are increasingly used as a source of raw material for the chemical industry whereby they are converted to useful products. Examples of such materials include the processing of novel materials from wood cellulose, hemi-celluloses of straw, grass, leaves, fruits and vegetables, and starch of cereals and tubers.

Several attempts have been made to utilize polysaccharides for the formation of biodegradable plastics. For example, Albertson and Ranby describe the formation of polyethylene foils blended with starch granules sealed inside the polyethylene microstructure. A. C. Albertson and B. Ranby, (1979), J. Appl. Polym. Sci., 35, 413-430. However, this method has been nearly completely abandoned because only the starch component biodegraded leaving powdered polyethylene behind in the environment.

U.S. Pat. No. 5,852,114, issued Dec. 22, 1998 to Loomis, et al., describes a biodegradable thermoplastic polymer blend in which a first polymer and a second polymer are intimately associated together in a uniform, substantially homogeneous blend. The composition may further comprise a polysaccharide component such as starch.

U.S. Pat. No. 5,166,336, issued Nov. 24, 1992 to Yamauchi, et al., describes a process for producing a corn milling residue carboxymethylether salt comprising reacting a corn milling residue with alkali in the presence of an aqueous carboxymethylating agent solution to give a corn milling residue carboxymethylether salt with an average degree of substitution of not less than 0.2.

U.S. Pat. No. 6,103,885, issued Aug. 15, 2000 to Batelaan, et al, describes a process for the amidation of a material having at least one carboxyl-containing polysaccharide. The carboxy groups are reacted with an ammonium donor of the general formula —NH to form the corresponding polysaccharide carboxyl ammonium salt, and a second step in which the polysaccharide carboxy ammonium salt is heated so as to convert the ammonium groups into corresponding amido groups.

U.S. Pat. No. 7,225,732, issued on Aug. 14, 2007 to Fischer et al, describes a process to solve the problem that starch alone is too viscous and intractable for conventional thermoplastic molding equipment such as injection molding or compound extrusion. The invention entails formation of a thermoplastic composition made of a mixture of starch and dialdehyde polysaccharide. The latter is produced from the chemical reaction set forth in FIG. 1, wherein periodate oxidation of starch cleaves the C2-C3 bond of the anhydroglucose unit of the polysaccharide to produce dialdehyde polysaccharide.

Additionally, there has been reported the production of biodegradable plastics from proteins. J. Jane and S. T. Tim, (1995). Progress in Plant Polymeric Carbohydrate Research (eds. F. Meuser, D. J. Munnes, and W. Seibel), Behr's Verlag, Hamburg, pp. 165-168; C. H. Schilling, T. Babcock, S. Wang, and J. Jane, (1995). J. Mater. Res. 10, 2197-2202 and J. Zhang, P. Mungara, P., and J. Jane, (2000). Polymer, 42, 2569-2578.

U.S. Pat. No. 5,710,190, issued Jan. 20, 1998 to Jane, et al., describes a biodegradable thermoplastic composite made of soy protein, a plasticizing agent, a foaming agent, and water that can be molded into biodegradable articles that have a foamed structure and are water-resistant with a high level of physical strength and/or thermal insulating properties.

Additionally, there has been reported the production of biodegradable plastics from mixture of polysaccharides and proteins. For example, U.S. Pat. No. 5,593,625, issued Jan. 14, 1997 to Reibel et al., describes a method of heating blends of legume-based thermoplastic materials (proteins) and cellulose fibers to form hard composite material. The composite microstructure consists of cellulose fibers embedded in a protein matrix. The fibers and matrix are chemically bonded to each other by hydrogen bonds that are naturally present in both cellulose and protein.

Biodegradable plastics have been made from several protein/anionic polysaccharide reaction products that were synthesized by an electrochemical method. For example, potato starch, pectin, xanthan gum, carrageen, and carboxymethyl cellulose served as anionic polysaccharide components that were used in forming reaction products with proteins. A. Dejewska, J. Mazurkiewicz, P. Tomasik, and H. Zaleska, (1995) Staerke, 47, among others.

U.S. Pat. No. 5,397,834, issued on Mar. 14, 1995 to Jane et al., describes a biodegradable, thermoplastic composition made of a two-step process of (1) periodate oxidation of starch to form dialdehyde starch by the same reaction described earlier in U.S. Pat. No. 7,225,732 and shown in FIG. 1; and (2) reaction of dialdehyde starch with free amino groups on proteins, a reaction that entails imine formation and subsequent Mannich reactions, yielding strong, covalently bonded cross linked products. In step two, the aldehydro groups of dialdehyde starch chemically bind with the amino groups of proteins forming CH═NH— moieties characteristic for Schiff bases. In turn, the resulting strong, covalent bonding between proteins and starch plays a significant role in improving tensile strength and slowing biodegradation; the greater the concentration of strong interpolymer covalent bonds between protein and starch, the greater the tensile strength and the slower the rate of biodegradation. It should be noted that step one of the process requires the use of expensive periodate reactants.

There is also disclosed in U.S. Pat. No. 5,523,293, that issued Jun. 4, 1996 to Jane, et al., and U.S. Pat. No. 5,665,152 that issued Sep. 9, 1997 to Bassi et al., a biodegradable thermoplastic polymer blend in which soybean protein is reacted with a carbohydrate filler, a plasticizer, and a reducing agent. Both of these patents entail use of a reducing agent to solve the problem that protein alone is too viscous to be molded into solid plastic articles by conventional thermoplastic molding equipment. The reducing agent is specifically designed to produce compositions with reduced viscosity by cleaving disulfide bonds in protein, thereby reducing the protein viscosity. The reducing agent is selected from the group consisting of sodium sulfite, sodium bisulfite, potassium sulfite, potassium bisulfite, sodium nitrite, sodium hydrosulfite, sodium pyrosulfite, ammonium sulfite, mercaptoethanol, cysteine, L-cysteine hydrochloride, cysteamine, L-cysteine tartrate, di-L-cyteine sulfite, ascorbic acid, hydrogen sulfide, glutathione, and combinations thereof. It should be noted that use of these reducing agents is expensive. It should also be noted that the main difference between U.S. Pat. No. 5,523,293 and 5,665,152 is that the latter places an upper limit of 80 degrees Centigrade on the thermoplastic forming temperature in order to avoid heat denaturation of protein.

At a microscopic scale within protein—polysaccharide composite materials, the extent of interpolymeric chemical bonding (crosslinking) between protein and polysaccharide molecules plays a significant role in three essential aspects of materials manufacturing and physical properties: (i) interpolymeric protein—polysaccharide bonds break and reform during viscous deformation of the composite material thereby controlling the viscoelastic properties of the composite material during plastic thermoforming operations; (ii) the same interpolymeric bonds between protein and polysaccharide molecules control the tensile strength and ductility of the molded composite material; and (iii) the same interpolymeric bonds between protein and polysaccharide molecules influence the rate of biodegradation of the molded composite material. With the phrase, "the extent of interpolymeric chemical bonding (crosslinking) between protein and polysaccharide molecules," it is meant both (i) the bond energies of individual interpolymeric bonds between protein and polysaccharide molecules in the composite material and (ii) the number density of interpolymeric bonds between protein and polysaccharide molecules per unit volume of the composite material. From hereinafter, the phrase, "extent of interpolymeric chemical bonding (crosslinking) between protein and polysaccharide molecules" is meant both (i) the magnitudes of the bond energies of individual interpolymeric bonds between protein and polysaccharide molecules in the composite material and (ii) the number density of interpolymeric bonds between protein and polysaccharide molecules per unit volume of the composite material.

It is important to distinguish differences in the extent of interpolymeric chemical bonding (crosslinking) between protein and polysaccharide molecules in the prior art. Earlier it was mentioned that U.S. Pat. No. 5,397,834 describes a composite material where dialdehyde starch is produced by periodate oxidation; thereafter, dialdehyde starch is covalently bonded to protein molecules via —CH=NH— moieties. It naturally follows that these strong, covalent, interpolymeric bonds between protein and starch significantly influence (i) the viscoelastic properties of the composite material during thermoplastic molding, (ii) the mechanical properties of the molded composite material, and (iii) the rate of biodegradation of the molded composite material. Earlier it was also mentioned that U.S. Pat. Nos. 5,523,293 and 5,665,152 describe protein—starch composites made by a chemical process that cleaves disulfide bonds in protein. In the microstructure of those composite materials, protein and polysaccharide molecules are cross linked by weak intermolecular hydrogen bonds. It naturally follows that these weak intermolecular hydrogen bonds between protein and polysaccharide molecules significantly influence (i) the viscoelastic properties of the composite material during thermoplastic molding operations, (ii) the mechanical properties of the molded composite material, and (iii) the rate of biodegradation of the molded composite material.

The object of this invention disclosed herein is to develop an improved protein-polysaccharide composite material with improved viscoelastic properties during thermoforming, improved mechanical properties in the formed composite and improved biodegradation characteristics without the need to chemically modify the protein or to break the C2-C3 bond of the anhydroglucose unit of the polysaccharide, both of which require expensive chemical treatments. The object is solved by a unique approach to interpolymeric chemical bonding (crosslinking) between protein and polysaccharide molecules: electrostatic chemical bonds (ionic bonds or salt bridges).

The object is solved by a five-step process of (i) dispersing the polysaccharide in an aqueous basic solution, (ii) agitating the mixture for a period of time, (iii) subsequently treating the mixture with a carboxylating process, where the phrase, "carboxylating process" hereinafter means any process or agent that results in the conversion of any hydroxyl group on any carbon atom of the anhydroglucose unit of the polysaccharide to a carboxylate, thereby forming a polysaccharide carboxylate (corresponding to FIG. 2), (iv) subsequently reacting the mixture with protein molecules to crosslink proteins to polysaccharide carboxylate molecules by electrostatic bonds (i.e., ionic bonds or salt bridges corresponding to FIG. 3), and (v) drying the composite material with a drying technique such as air drying, oven drying, spray drying, supercritical $CO_2$ drying, solvent dehydration, or a combination thereof. The resulting liquid material in step (iv) can be molded into a shaped component and dried into a final, solid shape. Alternatively, the dried material in step (v) can be thermoplastically molded by conventional plastic molding equipment.

Examples of reactants for the carboxylating process in this invention include but are not limited to reagents such as hypochlorite, acylating agents, and carboxymethylating agents. Hypochlorite and similar agents convert primary alcohols (e.g., C6 of the anhydroglucose unit of the polysaccharide) to carboxylates, whereas acylating agents, such as anhydrides, create an ester with the carboxyl function. Further, carboxymethylation with reagents such as chloroacetic acid forms an ether bond with the carboxyl function. The latter is exemplified by the well-known commercial product carboxymethylcellulose. The carboxylating process does not include periodate oxidation, which produces only dialdehyde polysaccharide, which is generally known in the field and does not produce carboxylates through the chemistries in this patent.

An alternate embodiment is to form the resulting liquid materials in step (iv) into thin sheets by conventional paper-making technology, where the thin sheets are formed by drainage of a fibrous-material suspension on a screen or between two continuously revolving screens. Alternatively, prior to advancing to step (v) in the manufacturing process, the liquid materials produced in step (iv) can also be applied as an adhesive film to bond various materials together including paper, wood, metal, glass, and ceramics.

It is important to note that crosslinking of polysaccharide carboxylates to protein in step (iii) entails reacting the carboxy groups of the anhydroglucose unit of the polysaccharide chain with protein, thereby forming electrostatic chemical bonds (ionic bonds or salt bridges) between protein and polysaccharide molecules (corresponding to FIG. 3). Such crosslinking does not entail the formation of strong, covalent bonds between protein and polysaccharide molecules. The entire process does not entail cleavage of any C—C bonds of the anhydroglucose units of the polysaccharide chain.

In addition, while U.S. Pat. Nos. 5,523,293 and 5,665,152 emphasize the need to break disulfide bonds in protein to allow flexibility in the final mixed bioplastic, we obtain a similar flexibility with less expensive reagents by making the chemical bond between the protein and polysaccharide itself flexible by producing the ionic bond. These bonds more easily break and reform under plasticizing conditions without the need to chemically modify the protein. Thus, the extrusion and molding properties of our approach come from entirely different chemistries.

It is expected that the ionic bond between amine groups of the protein and the polysaccharide carboxylate has an order of magnitude higher bond energy than a hydrogen bond. Hence, the invention accomplishes a strong, mixed copolymer with a lower intermolecular bond density than with simple intermolecular hydrogen bonding. This bond strength weakens in aqueous suspensions, but forms a stronger bond as the water is removed in the process of filtration or dehydration. Moreover, the invention likely has a similar intermolecular bond density as that described previously in U.S. Pat. No. 5,397,834, where dialdehyde starch is covalently bonded to protein molecules via —CH=NH—moieties. However, the ionic interpolymeric bond between protein and polysaccharide carboxylate in the invention is more easily metabolized during biodegradation than the strong, covalent bond crosslinking aldehyde starch to protein in U.S. Pat. No. 5,397,834. As a result, it is likely that the protein-polysaccharide carboxylate materials in the invention described herein have different biodegradation characteristics than that of the protein—aldehyde starch materials of U.S. Pat. No. 5,397,834.

A second objective of the invention described herein is to provide a robust manufacturing process capable of accepting a wide range of feedstock raw materials, including common polysaccharides that are currently in abundance as industrial waste materials or by-products. Examples of such raw materials are described below and include ethanol distillers' grain, sugar beet pulp, sawdust, and corncob.

Distiller's grain is a by-product or waste product from the manufacture of ethanol from crops including corn. Significant growth in the worldwide production of distiller's grain is anticipated as a result of rapid growth in the mass production of corn-derived ethanol for transportation fuel. Currently, the main use of this material is as an animal feed. It can also be incorporated into human snack food and spaghetti, and in one instance, it has been reported as an extender and thickener in urea-formaldehyde plywood adhesives.

Also, corncobs are usually considered waste material from industrial utilization of maize crops. Several applications of corncobs have been reported in the literature. For example, pulverized corncobs were admixed with various glues and petroleum-derived fibers to produce lignocellulosic composites. Polypropylene and other engineering polymers have been reinforced with pulverized corncob fiber and attempts to use shredded corncobs in paper making have also been published.

Corncobs, being largely cellulose and hemicellulose possess excellent absorbing properties and have been used in a variety of applications as absorbents, animal bedding, stove and furnace fuel, and as a carrier of agricultural fertilizers. They have also been transformed to charcoal and subsequently used as a sorbent. Pyrolysis of corncobs results in the production of furaldehyde and acetic acid. Enzymatic treatment of corncobs provides acetone and butanol as well as D-xylan and D-xylose. They are commonly pulverized into fine powder particles that are subsequently used as industrial abrasives. Corncobs contain approximately 47% cellulose in their woody fraction, and 36% cellulose in the pith and chaff fraction. In both fractions, approximately 37% hemicelluloses and 35 to 36% pentosans exist.

There should also be considered sawdust, which is a voluminous waste material of the forest products industry. Several value-added applications of sawdust have been reported in the literature. For example, the production of solid fuel by briquetting or pelletizing sawdust is common. Co-fermentation of sawdust with manure and co-liquefaction with coal are alternative routes to energy production. The use of sawdust as construction material for wood product boards and panels has been known since the nineteenth century. Recent developments include the use of sawdust for reinforcing polymers and as a component of wood-based cement-bonded boards.

There are many other natural sources of polysaccharides including leaves, bark, roots, straw, shells of seeds, stems of plants, and especially sugar beet pulp as a large volume by-product from the production of sugar from sugar beets. Although a large amount of this pulp is utilized as animal feed, the production of L-arabinose, and the production of paper, this utilization is not enough to significantly reduce the amount of this by-product.

THE INVENTION

Figure 1:
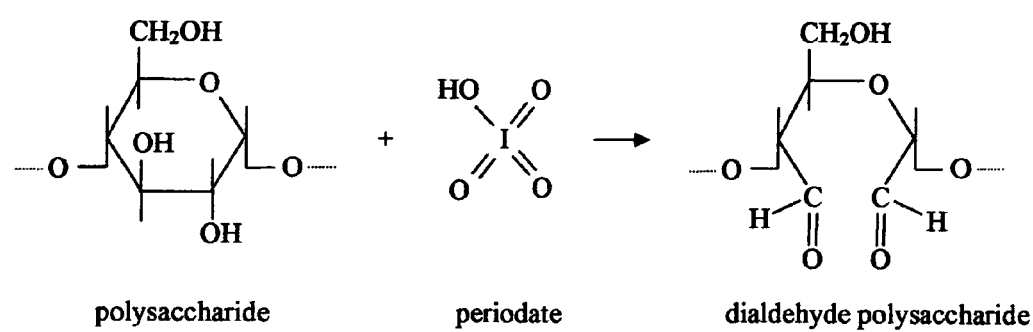
FIG. 1 shows the chemical reaction of periodate oxidation of polysaccharide, which cleaves the C2-C3 bond of the anhydroglucose unit of the polysaccharide to produce dialdehyde polysaccharide.
Figure 2:
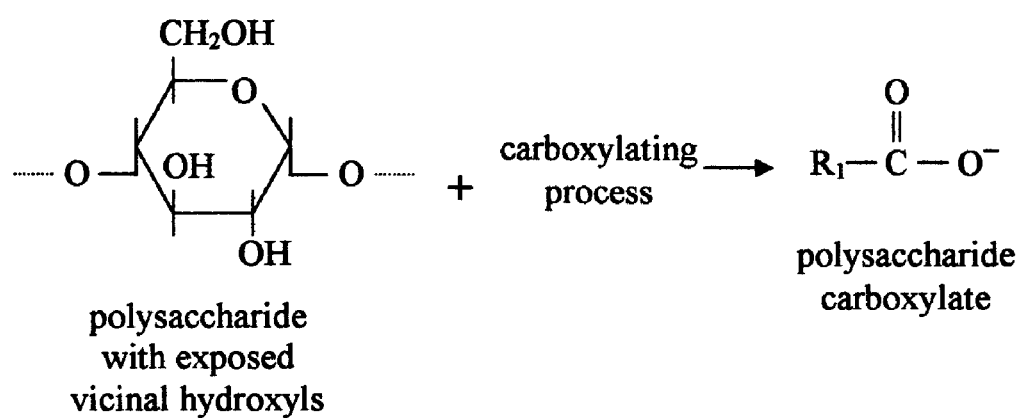
FIG. 2 shows the chemical reaction of a carboxylating agent with a pendant hydroxyl group at any carbon atom of the anhydroglucose unit of the polysaccharide to form a carboxylate, thereby forming polysaccharide carboxylate. The reaction product, $R_1COO$, is meant to describe a polysaccharide carboxylate where the pendant carbonyl is attached to any carbon atom of the anhydroglucose unit of the polysaccharide.
Figure 3:
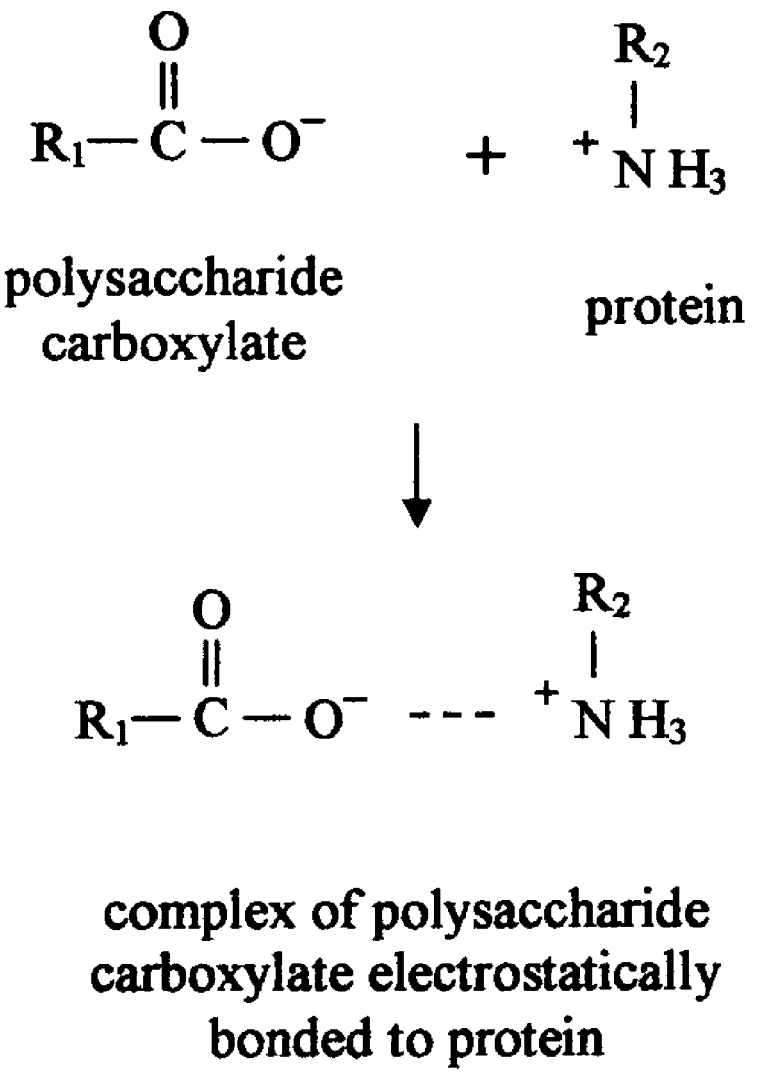
FIG. 3 shows the chemical reaction of a protein with a polysaccharide carboxylate, thereby forming an electrostatic chemical bond (ionic bond or salt bridge) between protein and polysaccharide carboxylate.

The object of the invention is to improve the mechanical properties and rate of biodegradation of protein—polysaccharide composite materials. The object is solved by dispersing the polysaccharide in an aqueous basic solution, subsequently treating the mixture with a carboxylating process that converts any hydroxyl group on any carbon atom of the anhydroglucose units of the polysaccharide to a carboxylate, thereby forming a polysaccharide carboxylate (corresponding to FIG. 2). The process subsequently entails reacting the mixture with protein molecules to chemically bond (crosslink) proteins to polysaccharide carboxylate molecules. Crosslinking entails the formation of electrostatic chemical bonds (ionic bonds or salt bridges) between protein and polysaccharide molecules (corresponding to FIG. 3).

With more specificity, this invention describes a method for the preparation of biodegradable plastics, the method comprising (I) providing a suspension in a basic aqueous carrier of a finely divided natural material containing polysaccharides, (II) agitating the suspension for a period of time and then, (III) subjecting the product resulting from step (II) to a carboxylating agent that converts any pendant hydroxyl group on any carbon atom of the anhydroglucose units of the polysaccharide chain to a carboxylate, thereby forming polysaccharide carboxylate (corresponding to FIG. 2), such a carboxylating agent selected from the group consisting of (A) acylation using materials selected from a group consisting of cyclic anhydrides of (i) maleic acid, (ii) succinic acid, (iii) glutaric acid, (iv) phthalic acid, and (v) derivatives of (i), (ii), (iii), and (iv); (B) carboxymethylation using materials selected from the group consisting of: (i) haloalkanoic acids and (ii) salts of haloalkanoic acids, and, (C) oxidation using an oxidizing agent selected from the group consisting of (a) hypochlorites, (b) hydrogen peroxide, (c) ozone and (d) air, to provide a solid anionic material.

Thereafter, there is a step (IV) consisting of combining the material resulting from (III) with a protein and allowing the protein to react with polysaccharide carboxylate, thereby forming electrostatic chemical bonds (ionic bonds or salt bridges) between protein and polysaccharide carboxylate molecules (corresponding to FIG. 3), Thereafter, there is a step (V) consisting of drying the composite material resulting from (IV) with a drying technique such as air drying, oven drying, spray drying, supercritical $CO_2$ drying, solvent dehydration, or a combination thereof. The resulting material in step (IV) can be molded into a shaped component and subsequently dried into a final, solid shape. Alternatively, the dried material in step (V) can be thermoplastically molded by conventional plastic molding equipment.

An alternate embodiment is to form the resulting liquid materials in step (IV) into thin sheets by conventional papermaking technology, where the thin sheets are formed by drainage of a fibrous-material suspension on a screen or between two continuously revolving screens. Alternatively, prior to advancing to step (V) in the manufacturing process, the liquid materials produced in step (IV) can also be applied as an adhesive film to bond various materials together including paper, wood, metal, glass, and ceramics.

A benefit of the process described herein is that adjusting the concentration of base in the aqueous solution of step (I) controls the dispersion of polysaccharide molecules in solution. It is well known that base in aqueous solution with polysaccharide is a chaotropic agent that interferes with the development of polysaccharide inter- and intra-molecular hydrogen bonds, thereby increasing the dispersion of polysaccharide molecules in solution. Altering the concentration base to regulate the degree of polysaccharide dispersion in solution thereby alters the availability of the carboxylating agent in step (III) to react with the pendant hydroxyl groups on the anhydroglucose units of the polysaccharide chains. In turn, this alters the quantity of carboxy groups forming on the anhydroglucose units of the polysaccharide chains. In turn, this changes the extent of interpolymeric chemical bonding (crosslinking) between protein and polysaccharide carboxylate molecules in step (IV) of the process. Consequently, the extent of interpolymeric chemical bonding (crosslinking) between protein and polysaccharide carboxylate molecules significantly influences (i) the viscoelastic properties of the composite material during thermoplastic molding operations, (ii) the mechanical properties of the molded composite material, and (iii) the rate of biodegradation of the molded composite material. Thus, adjusting the concentration of base in the aqueous solution of step (I) is beneficial to modifying the manufacturability, mechanical properties, and biodegradability of the composite material.

Another benefit of the process described herein is that changing the concentration of the carboxylating agent in step (III) alters the quantity of carboxy groups forming on the anhydroglucose units of the polysaccharide chains. In turn, this changes the extent of interpolymeric chemical bonding (crosslinking) between protein and polysaccharide carboxylate molecules during step (IV) of the process. This consequently modifies (i) the viscoelastic properties of the composite material during thermoplastic molding operations, (ii) the mechanical properties of the molded composite material, and (iii) the rate of biodegradation of the molded composite material.

It should be noted by those skilled in the art that steps I and II can be combined, depending on the composition of the starting natural material.

The method of this invention is applicable to a wide range of natural materials. The materials can be, for example, starchy materials, cellulose materials, lignocellulosic materials, hemicellulosic containing materials, and plant gum containing materials. Included in, but not limited to, are the polysaccharide-containing materials such as plant tubers, wheat, seed, shells of seeds, stems, roots, and leaves of plants, fruits and their skins, wood, tree branches, tree bark, straw, grass, and waste materials originating from the agricultural industry, for example, distiller's dry grain, sugar beet pulp, cellulose pulp, paper waste, cotton, linen, vegetables and vegetable waste, such as tomato skins and seeds, and the like.

According to the method, polysaccharide materials, or any one of them, are pulverized, ground, or minced, to render them into smaller particle sizes and then the minced material is suspended in a basic aqueous solution, for example metal hydroxides such as sodium hydroxide, potassium hydroxide and the like. Water is subsequently added to the solution, which is then agitated at room or elevated temperatures. For example, room temperature agitation should last 12 to 24 hours.

Thereafter, the saccharide component in the agitated suspension is subjected to a carboxylating process that reacts with pendant hydroxyl groups at any carbon atom of the anhydroglucose units of the polysaccharide to form polysaccharide carboxylates. For purposes of this invention, "carboxylating process" means any process or agent converting any existing pendant hydroxy group on the anhydroglucose units of the saccharide to a carboxylate without breaking any of the carbon to carbon bonds of the anhydroglucose units of the saccharide. The concentration of the carboxylating reactant should correspond to that resulting from the stoichiometry of reactions used to carboxylate the pendant hydroxy groups of the anhydroglucose units in the saccharide reaction mass. The previous step of dispersing polysaccharides in a basic aqueous solution is important, because it increases the availability of the pendant hydroxy groups of the anhydroglucose units in saccharide to react with the carboxylating agent. The greater the polysaccharide dispersion, the greater the production of polysaccharide carboxylate. In turn, the greater the degree of electrostatic intermolecular bonding between polysaccharide carboxylate and protein molecules in the subsequent stage of the process. Controlling the degree of electrostatic bonding between polysaccharide carboxylate and protein molecules in the final plastic material should correspondingly influence the tensile strength and biodegradability of the final molded plastic.

Methods of carboxylating pendant hydroxy groups in the anhydroglucose units of the polysaccharide include (i) acylation by reaction with the cyclic anhydrides described Supra, and derivatives of such anhydrides, (ii) carboxymethylation with haloalkanoic acids and their salts, for example, chloroacetic acid, bromosuccinic acid, iodomalonic acid, and the like, and (iii) oxidation of the material with an oxidizing agent that specifically does not cleave the C2-C3 bonds of the anhydroglucose unit of the polysaccharide, for example, hypochlorites, hydrogen peroxide, ozone, or air.

The reagent concentration ranges from $10^{-4}$ to $10^2$ moles per 10 grams of original saccharide material being derivatized. The reaction mixture is agitated at room temperature for up to 24 hours. A solid reaction product is subsequently separated from the reaction mixture by filtration, centrifugation or decantation.

Thereafter, the derivatized material can be transferred into another reaction vessel and subjected to one of two procedures comprised of reacting with protein using the derivatized saccharide.

Protein materials may be any that are readily available and may include soy protein isolate, casein separated from or dispersed in milk, whey protein isolate, whey protein, potato protein, ovalbumin and animal albumins, protein in blood from slaughter houses, molasses raffinate, and the like. The derivatized saccharide material can be suspended in water and subsequently admixed with solid protein.

The second possibility is that the derivatized saccharide is admixed with an aqueous solution of protein. In both cases, the protein concentration is in the range of from 0.1 to 500 weight percent of the original derivatized saccharide material. The exact proportion will depend on the degree of derivatization of the original saccharide. After blending, the reaction mixture is agitated for 1 to 24 hours at room or elevated temperature, followed by isolation of a reaction product that is a saccharide/protein reaction product that has a paste-like consistency. The isolation can be carried out by centrifugation, pressure filtration, decantation, or the like.

The resulting wet paste is then subjected to one of two procedures for plastic shaping, that is, it can be directly shaped by hand molding or by injection into a forming die and subsequently dried into a hard material, or, the west paste can be dried into hard fragments, subsequently pulverized into a powder, and then subsequently reconstituted into paste by the addition of water, and subsequently molded and/or injected into a forming die. The material is subsequently dried into a hard material, or the derivatized saccharide is directly molded or shaped without blending with protein. The wet paste can be processed by two alternative methods, namely, the wet paste can be directly shaped by either hand molding or by injection into a forming die, or the wet paste can be slightly acidified in order to increase the number of crosslinking ester bonds and subsequently heated and shaped by either hand molding or by injection into a forming die. In both cases, the material is subsequently dried into a hard material.

Also contemplated within the scope of this invention is the use of a dry film evaporator or a spray dryer to reduce the amount of water in the product prior to molding. Also contemplated within the scope of this invention is the use of conventional plastic thermoforming equipment, such as an injection molder or a compound extruder, to mold the dried composite of protein and polysaccharide carboxylate.

As used in the following examples, reagent grade glutaric, maleic, phthalic, and succinic anhydrides and sodium chloroacetate were provided by Aldrich Chemical, Milwaukee, Wis.

Isolated Soy Protein having the designation 066-974, PRO-FAM 974 was provided by Protein Specialties Division, Archer Daniels Midland Company, Decatur, Ill. and contained 6% moisture, 90% protein, 5% total fat, and 5% ash. The pH of the material was 7.0 to 7.4.

IR spectra: Infrared Spectra were measured using a Bruker Equinox 55 (Bruker, Madison, Wis., U.S.A.) Fourier Transform Infrared spectrometer fitted with a Pike Technologies Attenuated Total Reflectance attachment. Spectra were recorded with 32 scans at 4 $cm^{-1}$ resolution.

Samples were evaluated with a Differential Scanning Calorimeter DSC 550E from Instrument Specialists Inc., Spring Grove, Ill. from room temperature to 250° C. at a heating rate of 20° C. per minute. These measurements were obtained on solid samples contained in open pans in a stream of nitrogen.

Mechanical property testing such as the tensile strengths of individual pellets was measured by the diametric compression method. Individual pellets were compressed between flat compression platens in a computer-instrumented mechanical testing machine model 1125, Instron Corporation, Canton, Mass. At least 10 separate specimens of each specimen composition were subjected to mechanical testing. During each test, the displacement rate of the compression platens was 5 mm/min. Load versus displacement data were computer recorded for each compression test. The fracture strength, $\delta_f$ of each specimen was determined by the following formula $\delta_f=2P/(\pi Dt)$ wherein P is the load at fracture, D is the pellet diameter, and t is the pellet thickness.

EXAMPLES

Example 1

Distillers' dry grain with solubles (Dakota Gold DDG obtained from Dakota Commodities Incorporated, Scotland, S. Dak., that contained 88.38% dry matter with 30% crude protein, 12% crude fat and 5.38% ash was pulverized in a kitchen blender prior to use.

The DDG powder, 5 gm. was suspended in either 0.1 or 1.0 M aqueous NaOH solution (50 ml) and agitated for 24 hours at room temperature in a closed flask. Subsequently, deionized water (125) ml and 0.1 mole of one of the following acyl anhydrides was admixed to the suspension: glutaric, maleic, phthalic, and succinic anhydride. The reaction mixture was subsequently agitated for 24 hours in a sealed flask, followed by centrifugation for 30 minutes at 6000 rpm. Supernatants were decanted and the resulting centrifuge cakes were dried in air at 50° C.

DDG powder, 5 gm. was suspended in deionized water, 175 ml., and solid NaOH, (4.5 gms.) was subsequently added. The reaction mixture was agitated for 6 hours at room temperature in a closed flask, followed by the addition of sodium chloroacetate, 0.1 mole. The reaction mixture was subsequently agitated for 12 hours in a sealed flask, followed by centrifugation for 30 minutes at 6000 rpm. Supernatants were decanted and the resulting centrifuge cakes were dried in air at 50° C.

Five grams of isolated soy protein was dissolved in 100 ml of deionized water and 5 gms of the DDG derivative prepared above, was admixed therewith. The reaction mixture was agitated for 24 hours in a closed container, followed by centrifugation for 30 minutes at 6000 rpm. Supernatants were decanted and the resulting centrifuge cakes were transferred with a spatula into a pellet mold placed on a flat ceramic surface. The mold consisted of a flat acrylic sheet of 8 mm thickness that was perforated with individual 12.5 millimeter round holes. The filled mold was subsequently dried in air at room temperature for 24 hours. Moist pellets were then transferred to an oven and dried in air at 50° C. Ten pellets were prepared from each reaction product for subsequent mechanical property measurements. Diametral compression measurements were used in a universal mechanical testing machine to obtain tensile strengths of each pellet.

The addition of the derivatized DDG to solutions of the soy protein isolate immediately resulted in the precipitation of a solid reaction product. This occurred with all derivatized DDG specimens of this example. No reaction products precipitated after blending non-derivatized DDG with protein solution.

Figure 4:
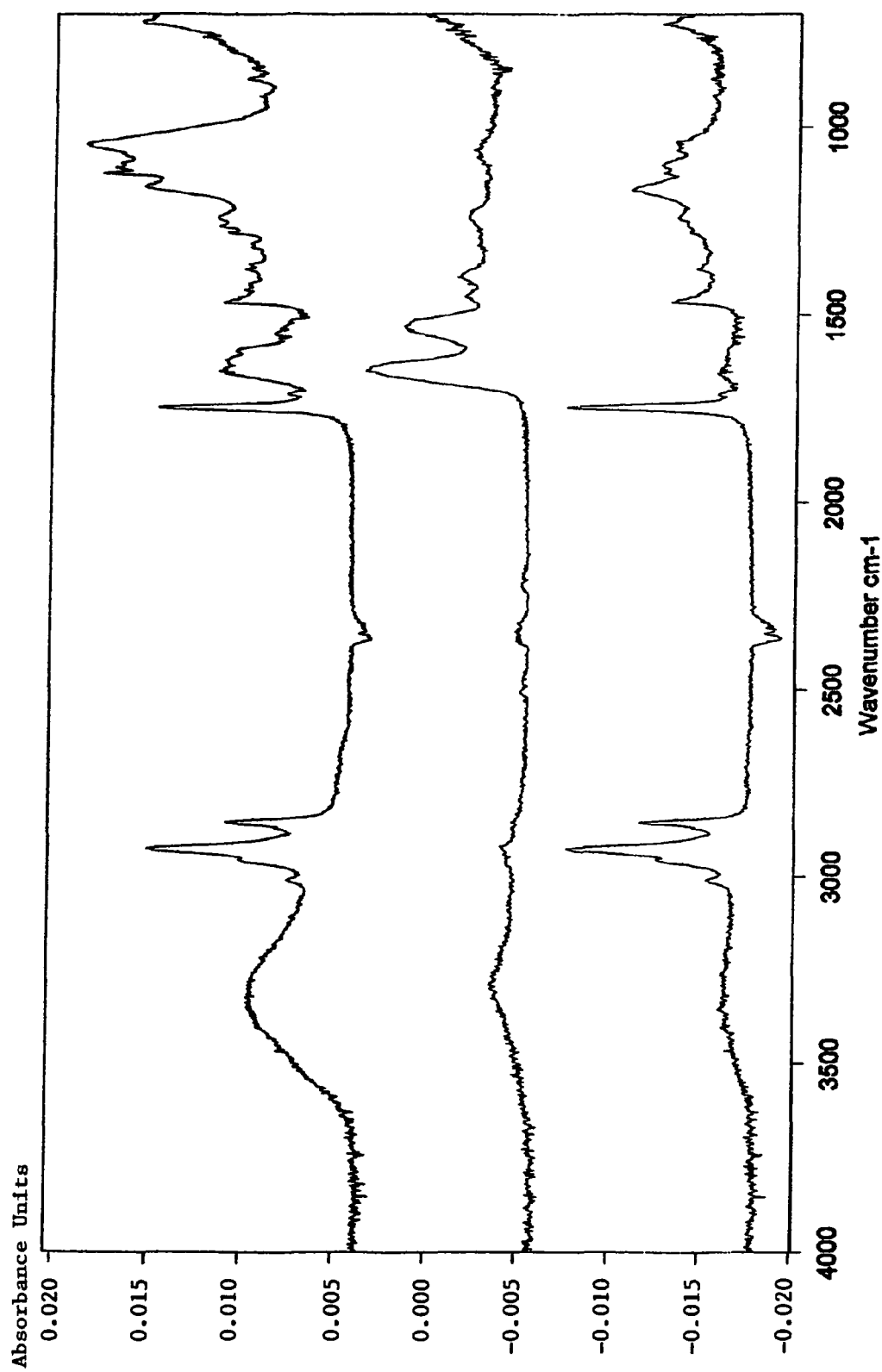
FIG. 4 are reproductions of infrared spectra of original DDG (top graph), original soy protein isolate (center graph), and DDG soaked in aqueous solution of NaOH (bottom graph).

Qualitative evaluation of the derivatization of DDG was based on IR analysis. FIG. 4 represents the IR spectrum of pulverized DDG before derivatization. The spectrum particularly in the regions of 1000 to 1200, 1200 to 1500, and 1500 to 1600 $cm^{-1}$ strongly resemble spectra of polysaccharides and oligosaccharides. These bands can be ascribed to C—O stretching, OH bending, and C=O stretching modes, respectively.

Protein present in DDG may be shown by bands incorporated in the region of 1500 to 1700 $cm^{-1}$ in FIG. 4. This is suggested from comparison of the spectrum of pulverized DDG with the spectrum of soy protein isolate in FIG. 4.

Figure 5:
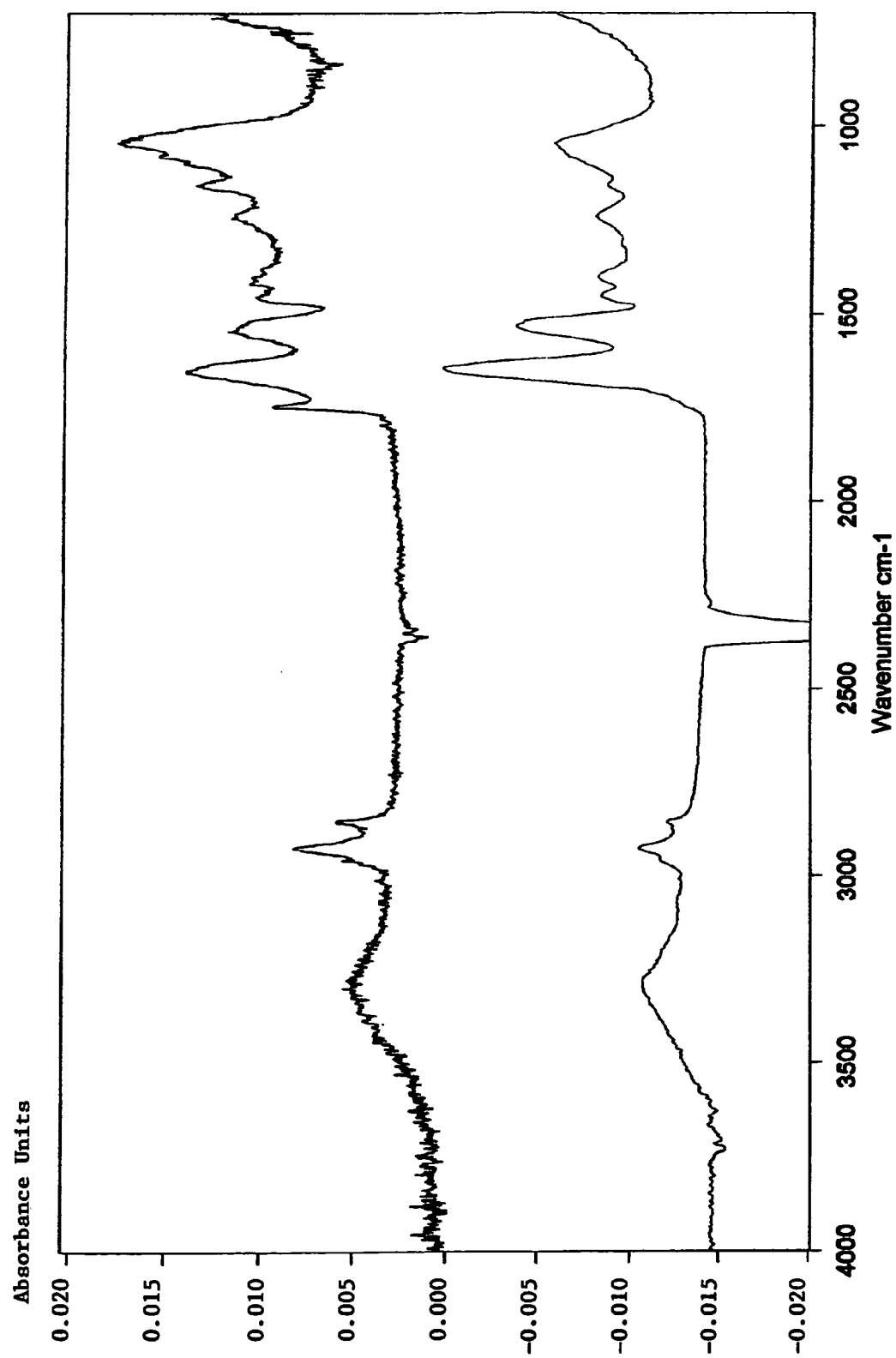
FIG. 5 are reproductions of infrared spectra of DDG derivatized with glutaric anhydride (top graph) and the reaction product of glutarated DDG with soy protein isolate (bottom graph).

FIG. 5 illustrates changes in the IR spectrum of DDG resulting from glutaration. In particular, the C=O stretching vibrations between 1500 and $1600^{cm-1}$ increased in intensity relative to the rest of the spectrum, and the C—O stretching region changed slightly, which is possibly due to the addition of specific C=O vibrations from the addition of glutaric anhydride. Similar changes were observed in IR spectra of DDG resulting from other acylations that are not shown. Upon reacting glutarated DDG with soy protein, further changes in the IR spectrum occurred. In particular, the protein C=O band intensities increased in the region of 1500 to 1700 $cm^{-1}$. Furthermore, the band at 1750 $cm^{-1}$ disappeared; this band can be attributed to an acid or ester C=O stretch, and its disappearance may indicate reaction of those groups to other forms. Subtle changes in the group of vibrations corresponding to the C—O stretch (1000 to 1200 $cm^{-1}$) and OH bend (1200 to 1500 $cm^{-1}$) of the hydroxyl groups may also suggest interaction of these groups with protein. Again, similar changes in these groups of bands were observed in IR spectra of DDG resulting from all other acylations.

Figure 6:
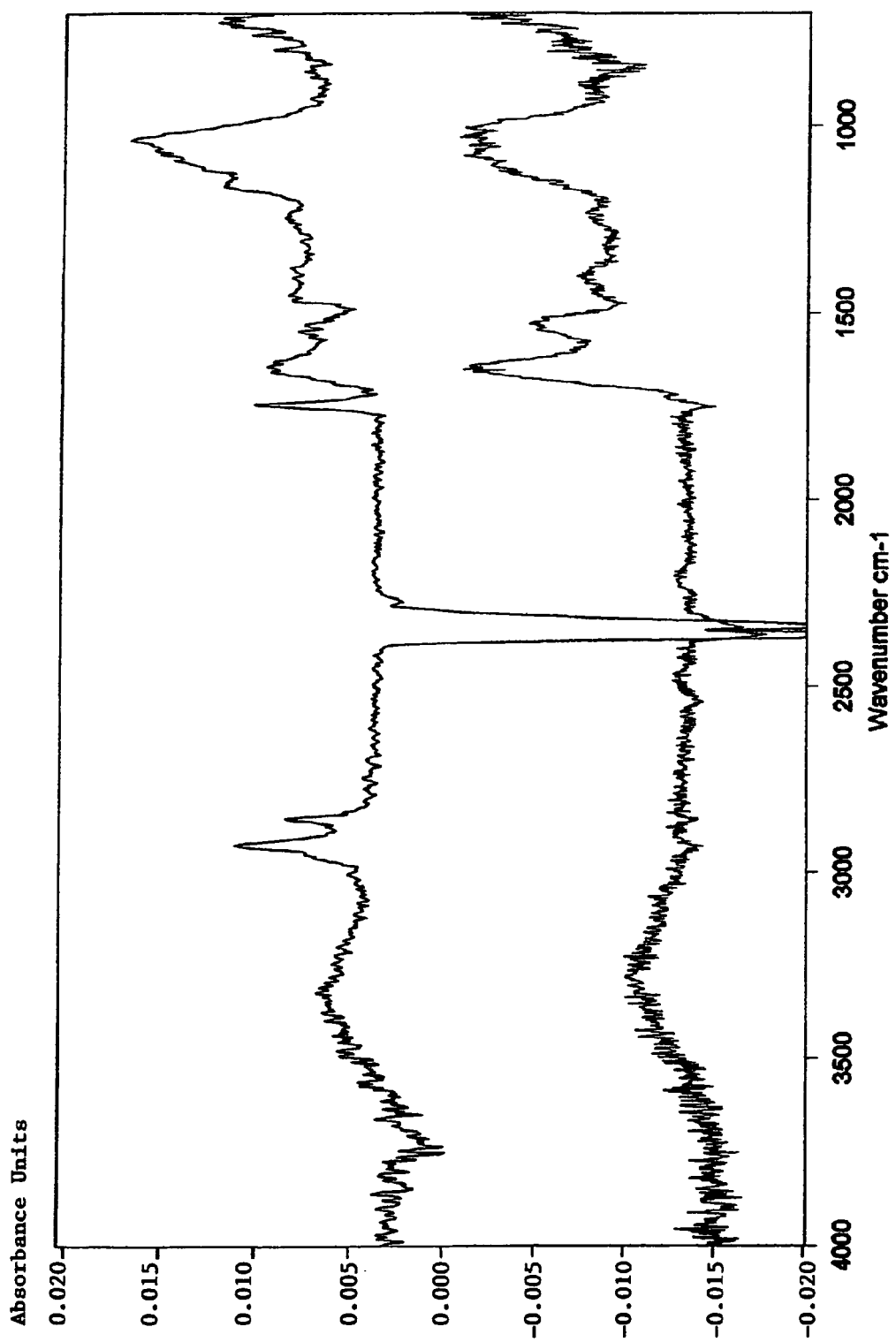
FIG. 6 are reproductions of infrared spectra of carboxymethylated DDG (top graph) and the reaction product of carboxymethylated DDG with soy protein isolate (bottom graph).

FIG. 6 shows the changes by carboxymethylation of DDG. The subsequent reaction product of carboxymethylated DDG with soy protein isolate evoked further changes in the IR spectrum. The most significant changes again were the appearance of protein bands and the vanishing free acid or ester C=O band at 1750 $cm^{-1}$.

In most cases, crack-free pellets were made by drying pastes that were previously isolated from aqueous suspensions of reaction products. Drying shrinkages are reported in Table 1 for all specimens except those resulting from carboxymethylation. Pellets that were made of DDG maleated in 1.0 M NaOH solution exhibited the highest shrinkage and simultaneously the highest strength. In contrast, maleation in 0.1 M NaOH solution led to pellets with minimum shrinkage and minimum strength. Glutaration, phthalation, and succination led to pellets that were slightly weaker than pellets resulting from maleation in 1.0 M NaOH.

TABLE I

Results of mechanical tests of pellets made of DDG reaction products with soy protein isolate

| DERIVATIZED DDG IN REACTION PRODUCTS | AVERAGE PELLET SIZE DUE TO SHRINKAGE[a] | | TENSILE STRENGTH MPa |
|---|---|---|---|
| | DIAMETER mm | THICKNESS mm | |
| Carboxymethylated[b] | — | — | — |
| Maleated[c] | 10.3 ± 0.1 | 6.1 ± 0.2 | 0.22 ± 0.1 |
| Maleated[d] | 8.9 ± 0.3 | 4.2 ± 0.3 | 1.67 ± 0.7 |
| Glutarated | 9.2 ± 0.3 | 5.6 ± 0.3 | 1.39 ± 0.4 |
| Phthallated | 9.2 ± 0.2 | 4.4 ± 0.2 | 1.21 ± 0.4 |
| Succinated | 9.1 ± 0.2 | 4.6 ± 0.2 | 1.27 ± 0.4 |

[a]Original size of cylindrical pellets was 12.5 mm diameter by 8 mm thick.
[b]No pellets suitable for measurements could be formed because of significant shrinkage
[c]Pellets made of DDG soaked in 0.1M aqueous NaOH solution prior to derivatization.
[d]Pellets made of DDG soaked in 1 M aqueous NaOH solution prior to derivatization.

Example 2

Corncob powder designated as 820R Lite-R-cob was purchased from the Anderson's Corncob Products, Maumee, Ohio. The product had a specific gravity of 0.8 to 1.2 and a moisture content of 10%, a particle size distribution of 3% of 3 mesh, 5% of 5 mesh, 10% of 8 mesh, 60% of 10 mesh, 15% of 20 mesh, and 5% of 30 mesh.

Acylation was carried out essentially as set forth in Example 1 using 5 grams of corncob in 50 ml of 1.0 M aqueous NaOH solution.

Carboxymethylation was carried out by using 5 grams of corncob powder and suspending it in deionized water (175 ml) with solid NaOH (4.5 grams). The reaction mixture was agitated for 6 hours at room temperature in a closed flask, followed by the addition of sodium chloroacetate (either 0.1 or 0.2 mole). The reaction mixture was subsequently agitated for 12 hours in a sealed flask, followed by centrifugation for 30 minutes at 6000 rpm. Supernatants were decanted and the resulting centrifuge cakes were dried in air at 50° C.

The formation of reaction products of the derivatized corncob powder and isolated soy protein was carried out as in Example 1. Tensile strengths were measured as in Example 1.

Figure 7:
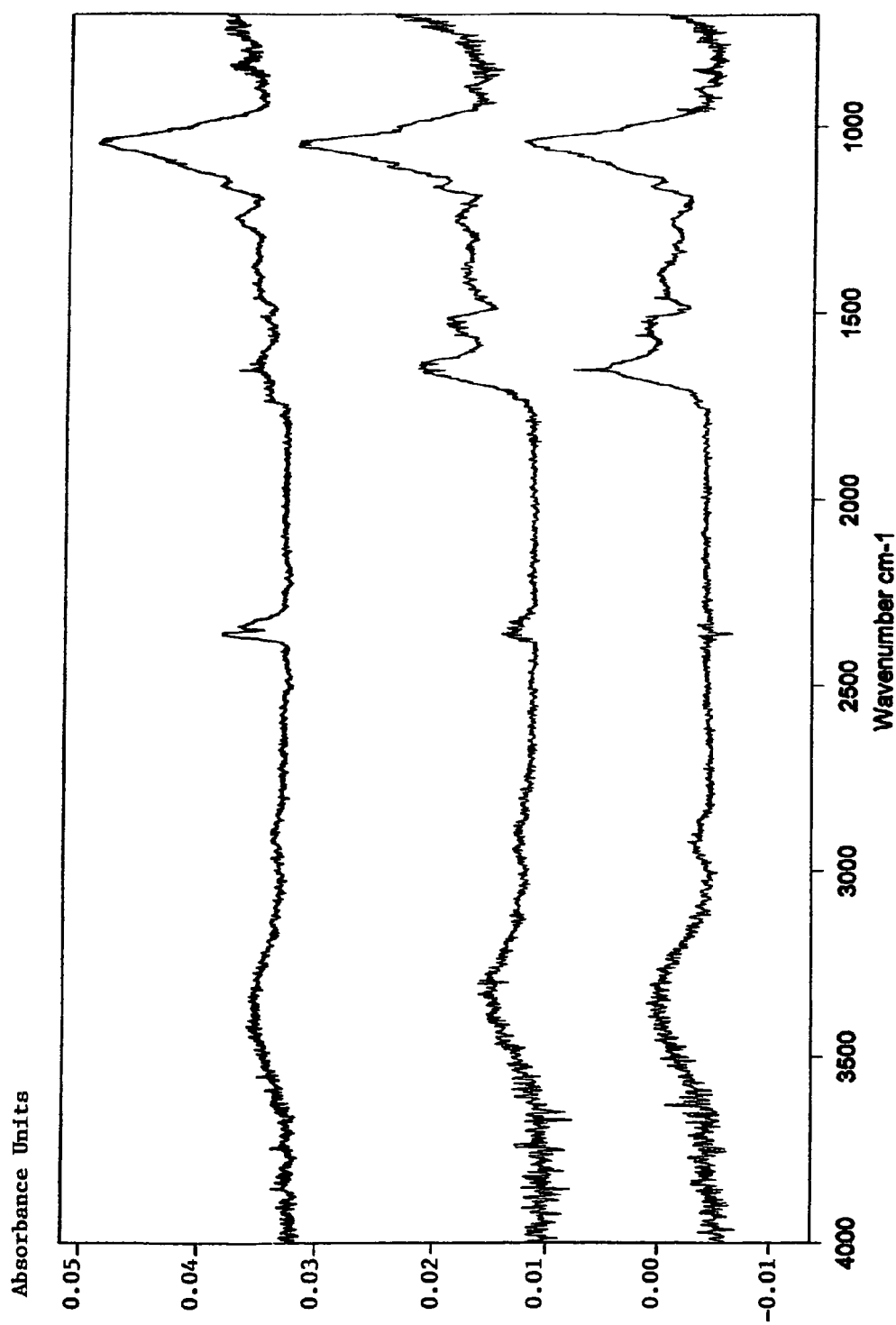
FIG. 7 are reproductions of infrared spectra of corncob powder (top graph), the reaction product of succinated corncob powder with soy protein isolate (center graph), and the reaction product of carboxymethylated corncob powder with soy protein isolate (bottom graph).

With reference to FIG. 7, infra red analysis showed a pattern that revealed the polysaccharide character of the material. In particular, bands at 1000 and 1500 to 1600 $cm^{-1}$ typify hydroxyl group vibrations of polysaccharides and oligosaccharides.

Changes in the spectrum were caused by the reaction of acylated corncob powder. FIG. 7 illustrates this observation in the case of succinated corncobs. Evident is the appearance of C=O peaks from the succinic anhydride as well as protein bands (1500-1700 $cm^{-1}$). The presence of these peaks supports the formation of a complex between protein and succinated corncob. Essentially the same spectral changes were observed for reaction products of soy protein with the other acylated corncob powders.

FIG. 7 illustrates that carboxymethylation of corncob powder followed by reaction with soy protein isolate also produced changes in the spectrum between 1400 and 1700 $cm^{-1}$. The most significant change was the appearance of C=O stretching bands, consistent with carboxymethylation and the presence of protein. These spectral occurrences suggest the formation of a complex of carboxymethylated corncob powder and soy protein isolate.

Differential scanning calorimetry of as-received corncob powder revealed two exothermic transitions. The first started at 41.8° C. with a peak temperature of 80.38° C. and an associated enthalpy change of −57.13 J/g. The second transition began at 156.90° C. with a peak temperature of 179.88° C. and an associated enthalpy change of −1.68 J/g. All subsequent derivatization of corncob powder did produce significant changes in these two exothermic transitions. Such derivatization produced negligible changes in the onset temperatures, the peak temperatures, and the enthalpy changes associated with both exothermic transitions.

TABLE II

Effects of the derivatization of corncob powder on the shrinkage and tensile strength of pellets made of reaction products with soy protein isolate.[a]

| DERIVATIZED CORNCOB IN REACTION PRODUCTS | | AVERAGE PELLET SIZE DUE TO SHRINKAGE[b] | | STRESS MPa |
|---|---|---|---|---|
| | | DIAMETER mm | THICKNESS mm | |
| Carboxymethylated | (A) | 6.4 ± 0.3 | 3.6 ± 0.2 | 20.7 ± 12.6 |
| | (B) | 5.9 ± 0.4 | 3.4 ± 0.1 | 28.9 ± 7.5 |
| Maleated | (A) | 9.4 ± 0.5 | 5.0 ± 0.4 | 2.4 ± 1.4 |
| | (B) | 9.1 ± 0.5 | 4.7 ± 0.4 | 5.1 ± 2.4 |
| Glutarated | (A) | 8.1 ± 1.8 | 5.9 ± 1.8 | 3.3 ± 2.3 |
| | (B) | 7.7 ± 0.8 | 4.5 ± 0.4 | 9.6 ± 4.0 |
| Phthallated | (A) | 8.1 ± 1.9 | 5.5 ± 1.9 | 1.2 ± 0.5 |
| | (B) | 9.0 ± 0.4 | 4.6 ± 0.3 | 3.0 ± 1.5 |
| Succinated | (A) | 9.2 ± 0.5 | 5.1 ± 0.4 | 2.7 ± 1.3 |
| | (B) | 9.6 ± 0.4 | 4.9 ± 0.8 | 1.4 ± 0.9 |

[a]Values (A) are for pellet preparations of a higher degree of derivatization (at 0.2 moles of reactant) and (B) values are for the preparations of a lower degree of derivatization (at 0.1 moles of reactant).
[b]Original dimensions of pellets prior to drying were 12.5 mm diameter by 8 mm thick All specimens exhibited brittle behavior in mechanical properties tests. Except in the case of succination, the lower degree of derivation produced larger amounts of shrinkage and higher strengths as shown in Table II. Carboxymethylation led to the strongest pellets, with strengths as high as 28.9 MPa.

Example 3

The sawdust used herein was provided by Putt, Incorporated, Freeland, Mich. and was hardwood chips known as Hardwood Tender Turf. The chips were pulverized in a kitchen blender and size fractionated using a series of sieve screens. The fine fraction that passed through a 30 mesh screen was used in the derivatization.

In the acylation procedure, five grams of the pulverized and sized fines were suspended in 1.0 M aqueous NaOH solution (50 ml) and agitated for 24 hours and handled as in Example 1.

The carboxymethylation was handled as in example 1.

Formation of reaction products of derivatized hardwood and isolated soy protein was carried out by dissolving 5 grams of isolated soy protein in deionized water (100 ml) and the derivatized hardwood powder (5 grams) was admixed therein. The reaction mixture was agitated for 24 hours in a closed container, followed by centrifugation for 30 minutes at 6000 rpm. Supernatants were decanted and the resulting centrifuge cakes were transferred into a pellet mold as in example 1 and pellets were molded. Tensile strengths were measured as in Example 1.

The derivatization of sawdust and the subsequent formation of reaction products with soy protein isolate were monitored by IR spectroscopy. The observed changes were similar to our observations of reactions with corn distillers' dry grain and corncob powder in the examples above. As shown in the top spectrum in FIG. 8, the as-received and pulverized sawdust exhibited a relatively strong group of bands from 1000 up to 1700 $cm^{-1}$ corresponding to C—O stretching, hydroxyl bending, and carbonyl stretching.

Figure 8:
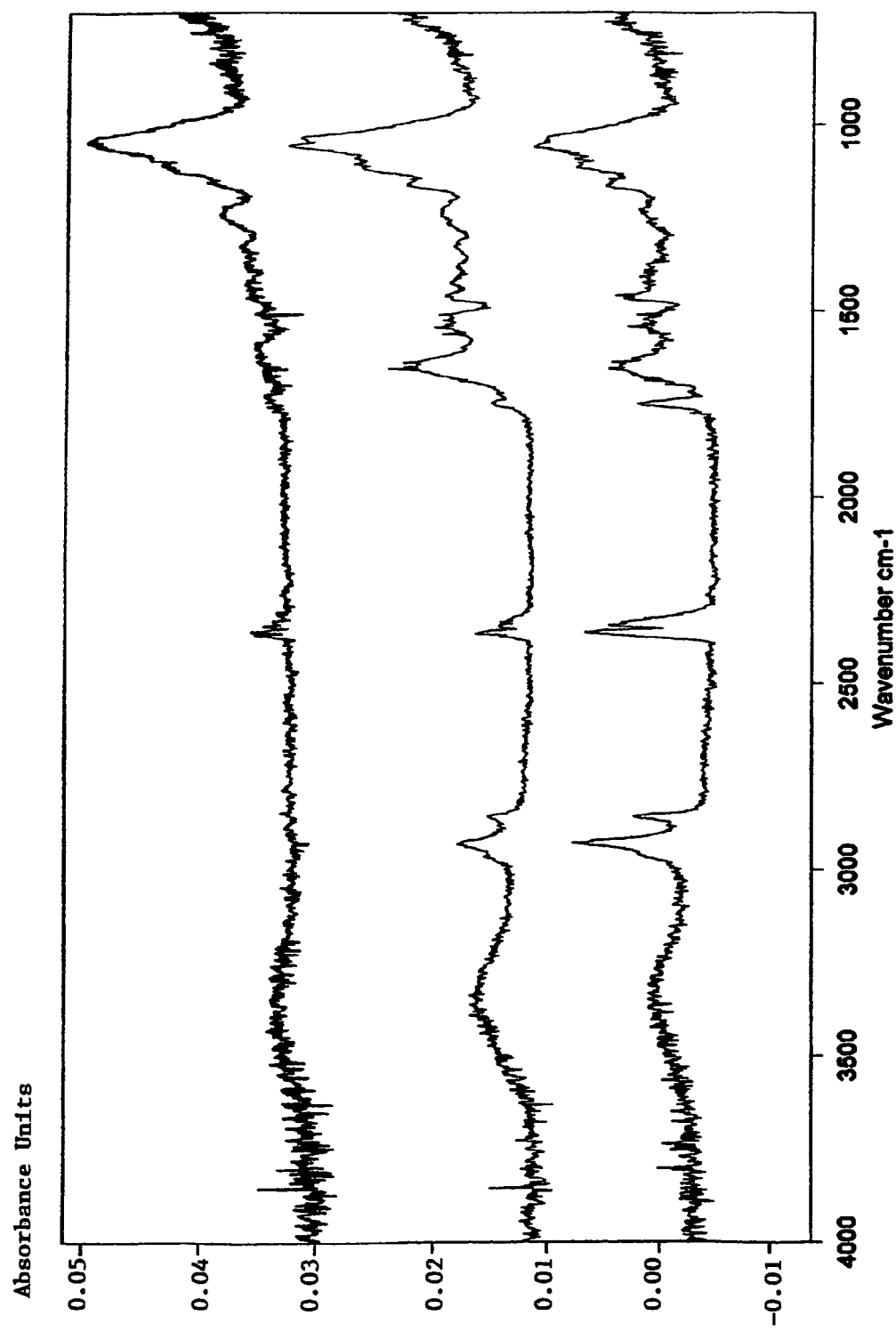
FIG. 8 are reproductions of infrared spectra of hardwood powder (top graph), the reaction product of glutarated hardwood powder with soy protein isolate (middle graph) and the reaction product of carboxymethylated hardwood powder with soy protein isolate (bottom graph).

The reaction of sawdust with glutaric anhydride and subsequently with soy protein isolate produced the IR spectrum which is presented in the middle of FIG. 8. Evident in FIG. 8 is the appearance of C=O peaks from the glutaryl moiety as well as typical protein bands. Also evident are C—H and O—H stretching bands near 2900 and 3400 $cm^{-1}$. These results support the hypothesis of the formation of glutarated sawdust complexes with soy protein. Essentially the same IR spectroscopy results were observed for all other acylated sawdust complexes with soy protein isolate (not shown).

Carboxymethylation of sawdust followed by reaction with soy protein isolate produced changes in the spectrum between 1400 and 1700 cm$^{-1}$ (bottom spectrum in FIG. 8). These spectral occurrences suggested the possible formation of a complex of carboxymethylated sawdust and soy protein isolate.

Differential scanning calorimetry provided data of low precision, because corresponding peaks were broad and shallow. As-received and pulverized hardwood powder that was not soaked in NaOH exhibited onset and peak temperatures at approximately 129.1 and 143.5° C., respectively, with a corresponding enthalpy change of −2.45 J/g. Derivatization of hardwood powder and subsequent reaction with isolated soy protein produced materials of lower onset and peak temperatures, however, the enthalpy changes decreased by an order of magnitude. This suggests the formation of reaction products.

Mechanical property tests indicate brittle behavior of all specimens tested. Table III illustrates the effects of the type of derivatization on the mechanical properties of reaction products between derivatized hardwood powder and soy protein isolate. Non-derivatized hardwood powder, after soaking in aqueous NaOH solution, formed a reaction product with soy protein isolate that had relatively low mechanical strength at 0.9 MPa. Higher strengths of up to 2.6 MPa were provided when hardwood powder was derivatized and subsequently reacted with soy protein isolate. Glutaration and maleation led to pellets with the highest strengths. All reaction products moderately shrank upon drying, suggesting that these materials are suitable for making reaction product shapes.

TABLE III

Effects of derivatization of hardwood powder on the drying shrinkage and tensile strength of reaction products with soy protein isolate

| DERIVATIZATION METHODS | AVERAGE PELLET SIZE DUE TO SHRINKAGE[a] | | TENSILE STRENGTH MPa |
|---|---|---|---|
| | DIAMETER mm | THICKNESS mm | |
| Soaked in NaOH[b] | 11.1 ± 0.5 | 7.5 ± 0.6 | 0.9 ± 0.5 |
| Carboxymethylated | 10.9 ± 0.9 | 5.7 ± 0.9 | 1.6 ± 1.2 |
| Glutarated | 10.7 ± 0.7 | 6.9 ± 0.6 | 1.3 ± 1.0 |
| Maleated | 10.1 ± 0.4 | 6.2 ± 0.6 | 2.4 ± 0.8 |
| Phthallated | 10.7 ± 0.4 | 6.6 ± 0.7 | 1.3 ± 0.7 |
| Succinated | 10.8 ± 0.4 | 6.7 ± 0.3 | 1.4 ± 0.5 |

[a]Original dimensions of pellets were 12.5 mm by 8 mm thick.
[b]Non-derivatized specimens Example 4

Corn distillers' dry grain with solubles (DDG), shredded corncob powder, hardwood powder, and shredded sugar beet pulp were separately oxidized with sodium hypochlorite. Infrared spectra and differential scanning calorimetry suggested that soy protein isolate formed reaction products with all of the above noted oxidized materials.

The Monitor Sugar Company, Bay City, Mich., provided the sugar beet pulp. The dry pulp contained 40% of pectin, 19.6% of cellulose, 18.0% of hemicellulose, 3.2% of sucrose and 1.5% of other components. Dried pulp was pulverized in a kitchen blender and size fractionated using a series of sieve screens. The fine fraction passed through a 30 mesh screen.

The sodium hypochlorite was Clorox bleach manufactured by the Clorox Company, Oakland, Calif. and contained 6% sodium hypochlorite. The Monitor Sugar Company, Bay City, Mich., provided the molasses raffinate, a source of protein. The material had a pH of 7.6, a density of 1300 kg/m$^3$, with 60% of total solids including 22% sucrose, 5% raffinose, 22.0% crude protein, 0.5% amino acids, and 30% ash.

Samples were prepared wherein 20 grams of DDG, hardwood powder, corncob powder, dried sugar beet pulp powder and minced wet sugar beet pulp were each suspended in a separate 1 M aqueous solution of NaOH (80 ml) and agitated for 24 hours at room temperature in sealed flasks. Bleach solution (200 ml) was subsequently added to each suspension, and agitation continued for an additional 24 hours in non-hermetically sealed flasks. In each flask, white precipitate formed. The precipitate was separated from each specimen by centrifugation for 30 minutes at 6000 rpm and either dried in air or subjected to complexation with soy protein isolate.

Reacting oxidized materials with soy protein was handled by dissolving 5 grams of soy protein isolate in deionized water (100 ml) followed by admixing a derivatized sample (5 grams) of each of the above described materials separately with soy protein. The reaction mixture was agitated for 24 hours in a sealed container, followed by centrifugation for 30 minutes at 6000 rpm. Supernatants were decanted and the resulting centrifuge cakes were transferred with a spatula into a pellet mold placed on a flat ceramic surface. The molding was handled as set forth above in example 1. Tensile strengths were measured as in Example 1.

The spectrum (FIG. 9) of pulverized DDG before derivatization contains bands in the regions of 100-1200, 122-1500, and 1500-1700 cm$^{-1}$, which can be respectively assigned to C—O stretching, OH bending, and C=O stretching modes. Protein present in DDG might be manifested by bands incorporated in the region of 1500-1700 cm$^{-1}$ in FIG. 9. This is suggested from comparison of the spectrum of pulverized DDG with the spectrum of soy protein isolate in FIG. 9. Soaking DDG in the aqueous solution of NaOH produced changes in the IR spectrum, particularly in the regions of 1500-1700 cm$^{-1}$ and also at 3400 cm$^{-1}$. Changes are also visible in the group of intensive bands in the C—O stretching region of 1000-1200 cm$^{-1}$, with subtle changes also in the 1200-1500 cm$^{-1}$ region. These changes suggest that soaking in NaOH influenced the hydroxyl groups in the polysaccharide portion of DDG.

Figure 9:
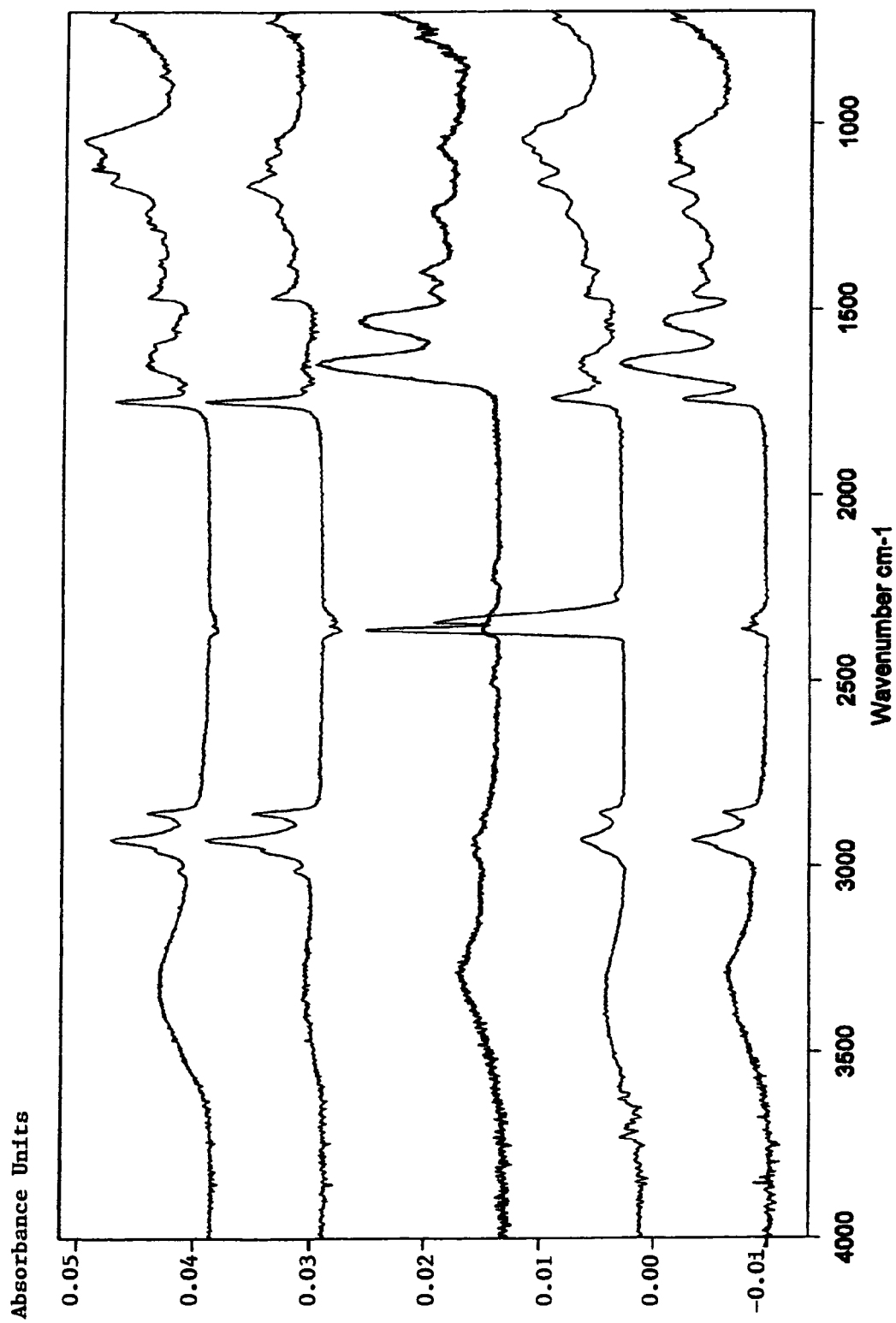
FIG. 9 are reproductions of infrared spectra of as-received and pulverized corn distillers' dry grain (top graph), corn distillers' dry grain soaked in aqueous NaOH solution (second from the top graph), soy protein isolate (middle graph), oxidized corn distillers' dry grain (fourth graph from the top), and the reaction product of oxidized corn distillers' dry grain with soy protein isolate (bottom graph).

Subsequent oxidation of DDG from exposure to bleach solution produced further changes in the spectrum, mainly in the bands associated with hydroxyl group vibrations in the regions of 3400 and 1200-1500 cm$^{-1}$ as shown in FIG. 9. Subsequent admixture of soy protein isolate with the aqueous suspension of oxidized DDG instantly precipitated a solid reaction product with an infrared spectrum exhibiting strong features of both protein and oxidized DDG.

Differential scanning calorimetry showed that oxidation of DDG resulted in a reduction in both the onset and peak temperature, indicating that the oxidized material is less thermally stable than as-received DDG. In addition, oxidized DDG exhibited a stronger exothermic transition, which suggests stronger interactions of functional groups in this material. Subsequent reaction of oxidized DDG with soy protein isolate produced a significant increase in thermal stability. However, the reaction product was weak, based on the significant increase of the change of enthalpy of the transition (see TABLE IV).

Figure 10:
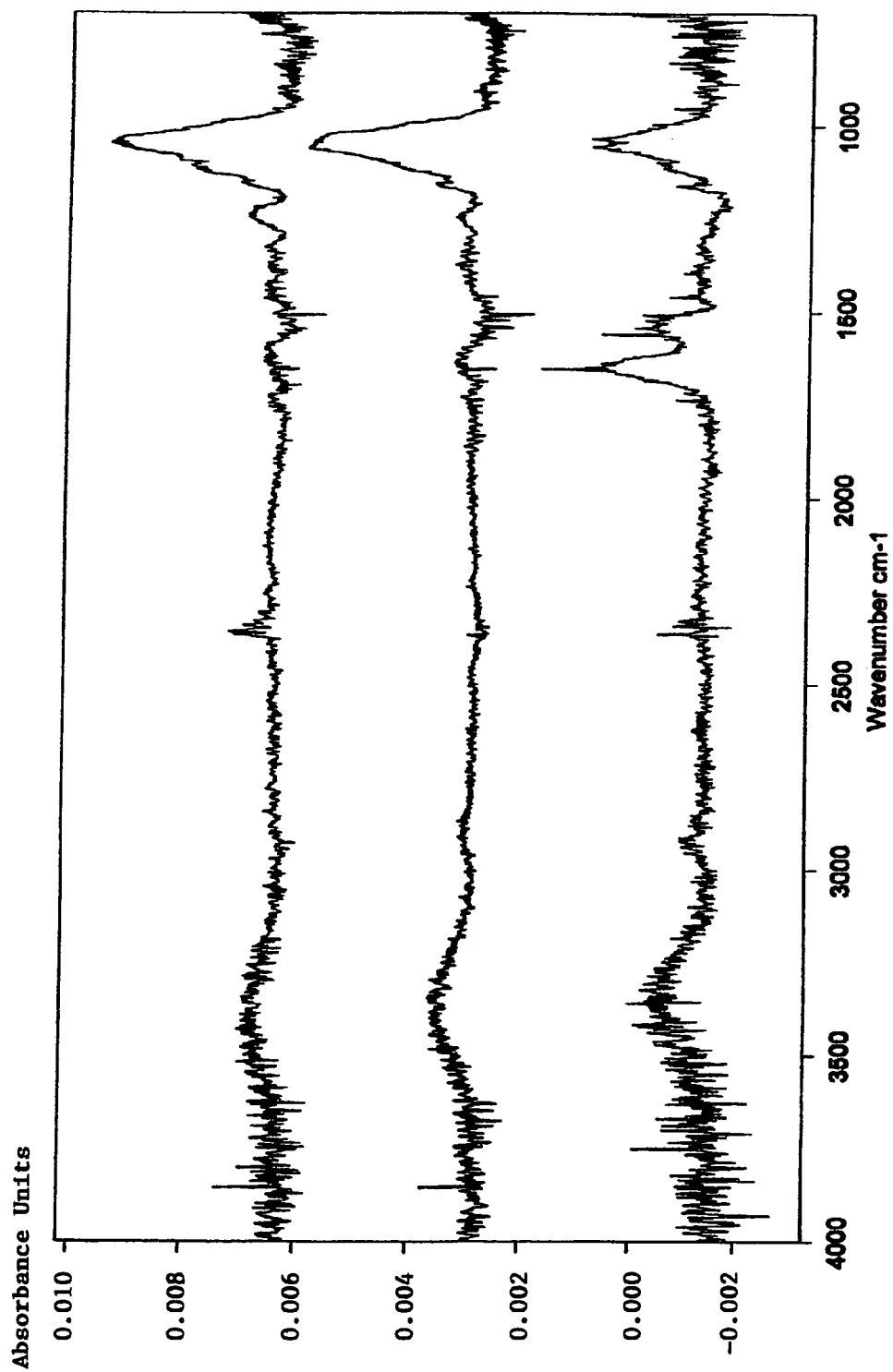
FIG. 10 are reproductions of infrared spectra of as-received and pulverized hardwood powder (top graph), oxidized hardwood powder (center graph), and the reaction product of soy protein isolate with oxidized hardwood powder (bottom graph).

The oxidation of hardwood powder also resulted in subtle changes in the infrared spectra as shown in FIG. 10. In particular, oxidation increased the intensity in the hydroxyl group vibration at 3400 cm$^{-1}$. Similarly to the case of oxidized DDG, complexation of oxidized hardwood powder with protein caused instantaneous separation of the reaction product from solution. The spectrum (FIG. 10) of the reaction product exhibited strong features of both protein and hardwood powder.

Differential scanning calorimetry indicated that reaction products of protein with oxidized hardwood powder were more thermally stable than either the oxidized or non-oxidized hardwood specimens. The order of magnitude decrease in the enthalpy change suggests that the protein reaction product was more stable than oxidized hardwood powder prior to complexing.

Figure 11:
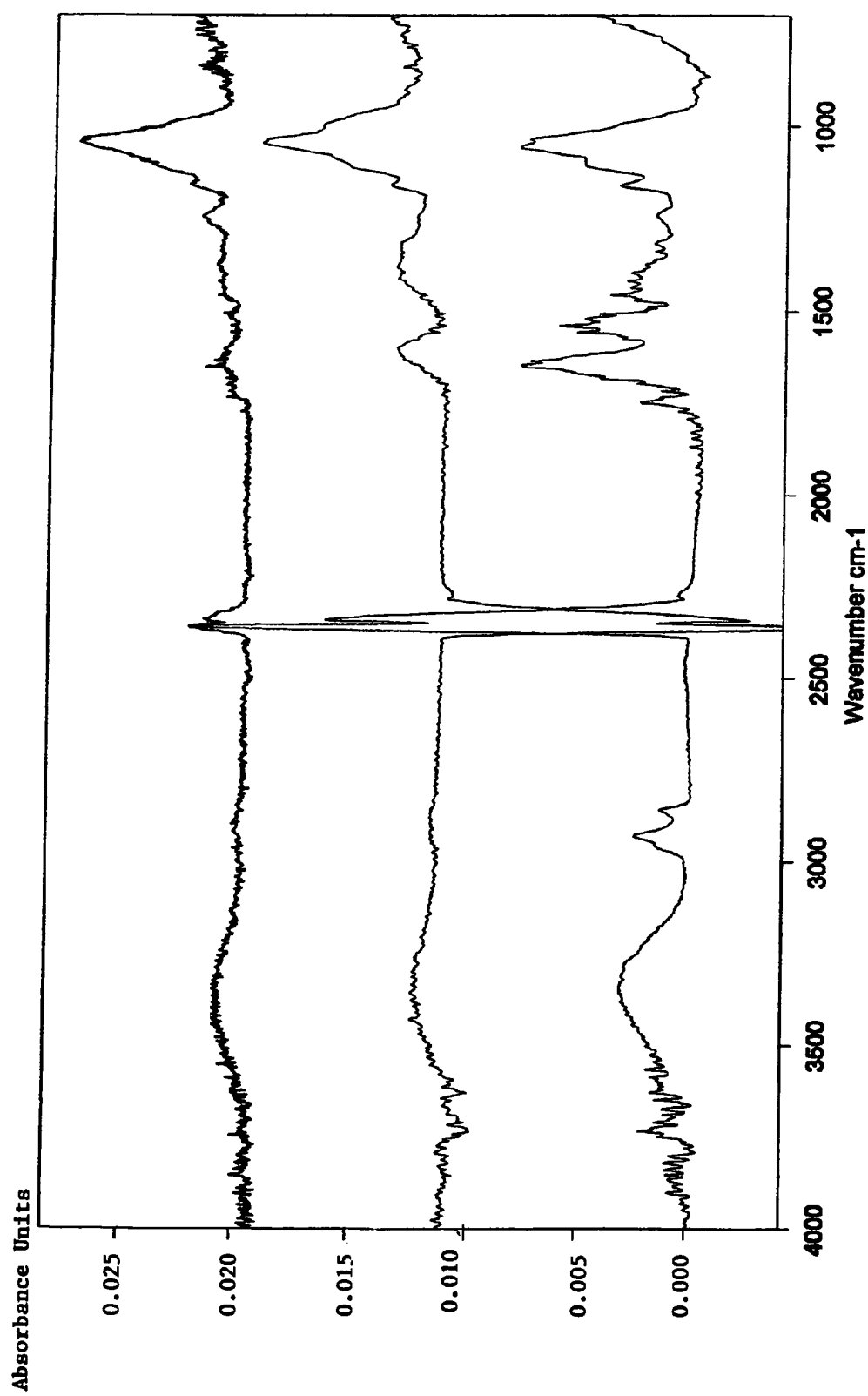
FIG. 11 are reproductions of infrared spectra of as-received corncob powder (top graph), oxidized corncob powder (center graph) and the reaction product of soy protein isolate with oxidized corncob powder (bottom graph).

FIG. 11 presents infrared spectra of corncob powder, oxidized corncob powder, and the reaction product of oxidized corncob powder with soy protein isolate. Oxidation of corncob powder significantly changed in the infrared spectrum, mainly in the bands associated with hydroxyl group vibrations in the regions of 3400 and 1200-1500 $cm^{-1}$. Similarly to the previous cases, admixing protein with oxidized corncob powder caused instantaneous separation of the reaction product from solution. The spectrum of the reaction product exhibited strong features of both oxidized corncob powder and protein.

Similarly as in the previous cases of DDG and hardwood powder, reaction products of protein with oxidized corncob powder provided a material with higher thermal stability than either the oxidized or non-oxidized corncob powder. Minor differences in the changes of the enthalpy of transitions point to the formation of a weak reaction product.

TABLE IV

Differential scanning calorimetry of original and hypochlorite oxidized materials as well as their reaction products with soy protein

| TYPE OF SAMPLE | TEMPERATURE ° C. | | CHANGE OF ENTHALPY |
|---|---|---|---|
| | ONSET (T°) | PEAK ($T_p$) | $-\Delta H/Jg$ |
| Corn Distillers' Dry Grain | | | |
| Non-treated | 91.90 | 133.40 | 86.68 |
| Oxidized | 51.23 | 101.69 | 92.87 |
| Oxidized/Protein Reacted | 132.54 | 156.63 | 3.86 |
| Hardwood Powder | | | |
| Non-treated | 129.09 | 143.50 | 2.45 |
| Oxidized | 116.29 | 119.68 | 1.35 |
| Oxidized/Protein Reacted | 147.39 | 180.06 | 13.74 |
| Corncob Powder | | | |
| Non-treated | 156.90 | 179.88 | 1.68 |
| Oxidized | 162.92 | 167.13 | 0.48 |
| Oxidized/Protein Reacted | 202.62 | 207.00 | 0.28 |
| Sugar Beet Pulp | | | |
| Non-treated | 66.98 | 114.81 | 26.31 |
| Oxidized | 88.64 | 155.31 | 45.81 |
| Oxidized/Protein Reacted | 129.02 | 148.68 | 51.85 |
| Soy Protein Isolate | | | |
| Non-treated | 87.23 | 130.56 | 36.78 |

[a]The average estimation error for all cases does not exceed ±20%.

Figure 12:
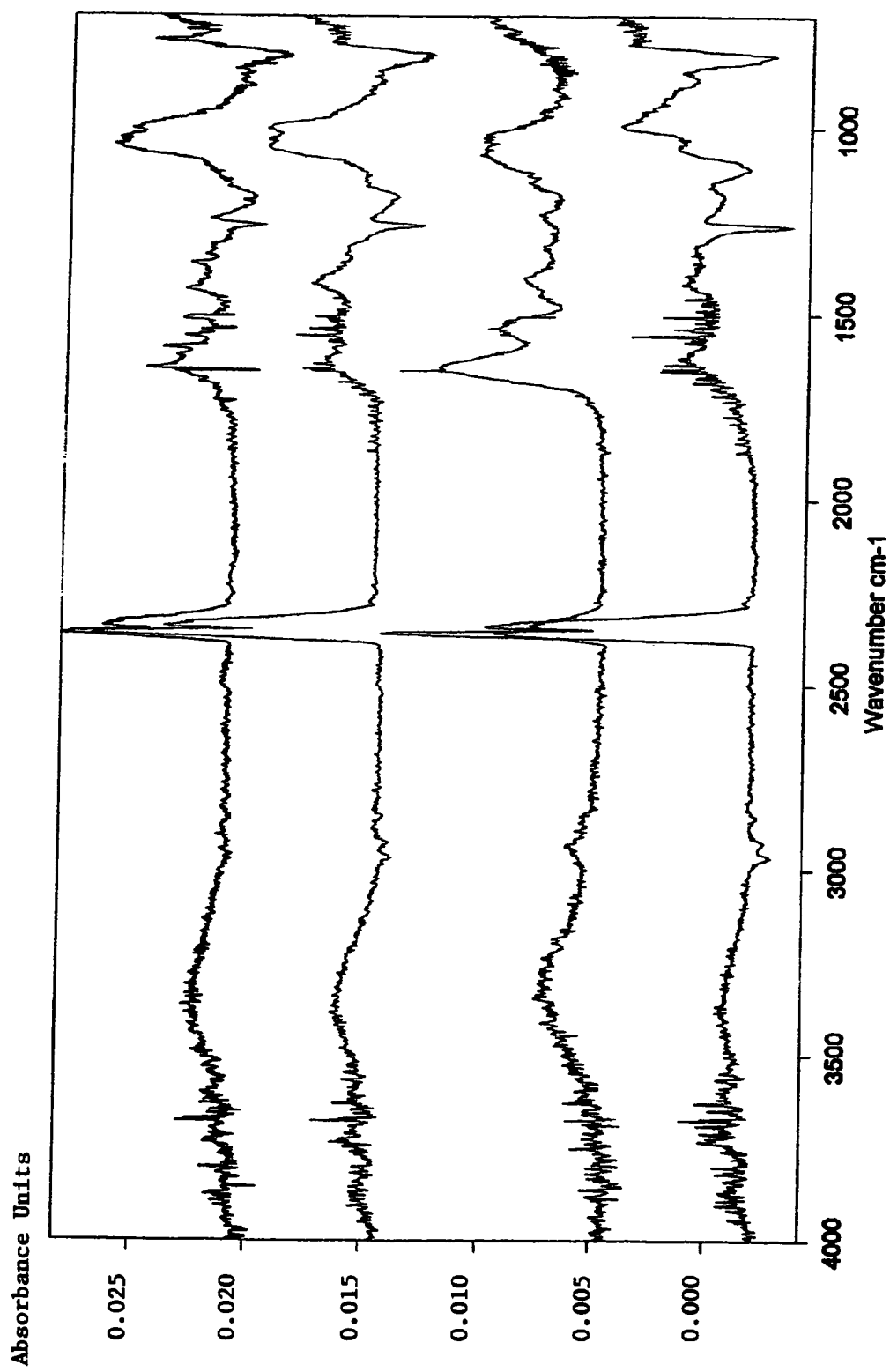
FIG. 12 are reproductions of infrared spectra of as-received and pulverized sugar beet pulp (top graph), as-received and pulverized sugar beet pulp soaked in aqueous NaOH solution (second graph from the top), a reaction product of oxidized sugar beet pulp with soy protein isolate (third graph from the top), and oxidized sugar beet pulp (bottom graph).

It is essential to de-methylate pectin in sugar beet pulp in order to provide a sufficient number of anionic reaction sites capable of reacting with proteins. Taking this fact into account, prior to admixing with protein, either dry or wet sugar beet pulp was soaked in aqueous NaOH solution. Such soaking of either dry or wet sugar beet pulp resulted in the formation of a swollen, gelatinous material. However, only subtle changes in the infrared spectra of sugar beet pulp were observed before and after soaking in NaOH (FIG. 12). Subsequent oxidation of sugar beet pulp produced only minor changes in the C—O stretching (1000-1200 $cm^{-1}$) and OH bending (1200-1500 $cm^{-1}$) regions. Again, similar to the previous cases, subsequent admixing of protein with oxidized sugar beet pulp caused instantaneous separation of the reaction product from solution. As shown in FIG. 12, the spectrum of the reaction product exhibited strong features of both oxidized sugar beet pulp and protein.

As shown in TABLE IV, the reaction product of soy protein with oxidized sugar beet pulp had a much lower enthalpy of transition than corresponding enthalpies for all other protein-polysaccharide reaction products in this study.

As shown in Table V, tensile strengths as high as 9.5 MPa were observed in pellets formed of protein reaction products with either oxidized corn distiller' dry grain or oxidized dried sugar beet pulp. Strengths as high as 3.9 MPa were observed in pellets that were prepared from protein reaction products with oxidized wet sugar beet pulp. Much lower strengths were produced by soy protein reaction products with either oxidized hardwood powder or oxidized corncob powder. All pellets were hard, brittle, and non-sticky to the touch. In one of the experiments with oxidized and dried sugar beet pulp, molasses raffinate was used as a source of protein. The resulting pellets were soft and sticky to the touch.

TABLE V

Measurements of the drying shrinkages and tensile strengths of pellets made of protein reacted with oxidized agricultural waste materials

| DERIVATIZED MATERIAL | AVERAGE PELLET SIZE DUE TO SHRINKAGE | | TENSILE STRENGTH |
|---|---|---|---|
| | Diameter/mm | Thickness/mm | MPa |
| Corn distillers' dry grain | 7.2 ± 0.3 | 3.8 ± 0.3 | 9.5 ± 2.3 |
| Hardwood powder | 9.0 ± 0.6 | 4.2 ± 0.4 | 1.3 ± 0.5 |
| Sugar beet pulp (dry)[b] | 7.0 ± 0.2 | 4.1 ± 0.2 | 9.2 ± 2.1 |
| Sugar beet pulp (dry)[c] | 9.2 ± 1.4 | 5.6 ± 1.5 | 1.8 ± 0.2 |
| Sugar beet pulp (wet) | 6.7 ± 0.2 | 3.9 ± 0.2 | 3.9 ± 1.3 |
| Corncob powder | 8.0 ± 0.4 | 4.9 ± 0.3 | 3.4 ± 1.1 |

[a]Original dimensions of pellets were 12.5 mm diameter by 8 mm thickness.
[b]From derivatized, dry pulverized pulp and reacted with soy protein isolate
[c]From derivatized, dry pulp and reacted with protein in molasses.

Example 5

Two sets of specimens were prepared using defatted soy meal as a feedstock: (1) oxidized corncob powder reacted with defatted soy meal, and (2) oxidized corn distillers' dried grain (DDG) reacted with defatted soy meal. Oxidized corncob powder and oxidized DDG were prepared using the procedures specified in Example 4. Defatted soy meal was purchased from a local grain elevator. Procedures entailed the following consecutive sequence of operations: (i) preparing aqueous slurries of corn cob powder or DDG in dilute NaOH for 24 hr, followed by (ii) admixing sodium hypochlorite with such slurries for 24 hr to oxidize corncob powder or DDG, followed by (iii) centrifuging and subsequently decanting supernates, followed by (iv) washing the centrifuge cakes in order to decrease hypochlorite concentrations. Washing entailed the following sequence of operations: (i) dispersing individual centrifuge cakes in deionized water, followed by centrifugation; (ii) decanting supernates and re-dispersing individual centrifuge cakes in deionized water; (ii) decanting supernates, followed by admixing centrifuge cakes with soy meal (or soy protein isolate) as discussed below.

Parallel to the above experiments, defatted soy meal was dissolved in dilute NaOH for 24 hours, followed by centrifugation. Supernates were subsequently decanted, and centrifuge cakes were then washed using similar procedures as described above. Washed centrifuge cakes were subsequently dispersed with deionized water and then admixed with centrifuge cakes of oxidized DDG or corncob powder described above. Resulting slurries were stirred with a magnetic stirrer for 24 hr to provide sufficient time for crosslinking polysaccharide carboxylates to proteins. Centrifugation followed, and supernates were subsequently decanted. Resulting centrifuge cakes had a paste-like consistency and were extracted from centrifuge tubes using a hand held laboratory spatula. Pastes were subsequently divided into small, centimeter-sized pieces that were set in polyethylene dishes and dried in air for 24 hr at 50 degrees Centigrade. The resulting dried centrifuge cakes exhibited a hard, solid consistency and were pulverized into flakes using a coffee grinder.

A second set of experiments was performed using commercially available soy protein isolate instead of defatted soy meal. There was only one minor change in procedures: soy protein isolate was not subjected to washing prior to admixing with oxidized polysaccharide. Dried centrifuge cakes (prepared with either DDG or corncob) exhibited a similar, hard solid consistency regardless of whether soy protein isolate or defatted soy meal had been admixed. These experiments suggested that the more costly soy protein isolate could be successfully replaced with the more economical soy meal without sacrificing mechanical properties.

Pellet manufacturing procedures entailed the following consecutive sequence of operations: (i) a weighed amount (3 g) of a given flaked sample was poured into a cylindrical steel die measuring 2 centimeters diameter and heated in air for approximately 30 minutes to either 100° C., 125° C., or 150° C., (ii) the die set was moved by hand to an adjacent uniaxial hydraulic laboratory press; (iii) the die set was uniaxially pressed to a force of 4,000 pounds for 20 minutes; (iv) the die set was removed from the hydraulic press and cooled to room temperature; and (v) the die set was disassembled, and solid pellets were removed from the die set. The mass density of each pellet was calculated by weighing each pellet and measuring its dimensions using a micrometer. Tensile strengths were measured as in Example 1. At least four pellets of each composition and pressing temperature were generated to evaluate repeatability of density and tensile strength measurements.

Table VI illustrates the effects of composition and compression-mold temperature on the average mass densities of the pellets. All pellets exhibited a hard, solid consistency upon ejection from the die. Specimens fabricated from soy protein isolate exhibited a mass density of 1.3 g/cm³ regardless whether oxidized corncob or oxidized DDG was utilized. Specimens fabricated from defatted soy meal exhibited a slightly higher mass density of 1.4 g/cm³ regardless whether oxidized corncob or oxidized DDG was utilized. No composition exhibited any significant change in mass density as the compression-mold temperature varied. It should be noticed that a low temperature of only 100° C. is needed to achieve densification. This is important because, in general, the lower the densification temperature, the lower should be the cost of manufacturing operations in a scaled-up, mass-production setting. While no literature studies exist on thermoforming the same compositions as discussed in this report, published experiments exist on the compression molding of soy protein isolate alone (*J. Mater. Res.* 10 [9] 1995, pp. 2197-2202). In those published studies, a higher temperature of 140° C. is needed to achieve densification.

Table VII illustrates the effects of composition and compression-mold temperature on the tensile strengths of the pellets. Acceptable tensile strengths were obtained at all compression-mold temperatures evaluated. Highest tensile strengths were observed at a compression molding temperature of 125° C.

TABLE VI

Measurements of pellet density (g/cm³) as a function of composition and compression-molding temperature.

| TEM-PERATURE | OXIDIZED CORNCOB AND SOY ISOLATE | OXIDIZED DDG AND SOY ISOLATE | OXIDIZED CORNCOB AND SOY MEAL | OXIDIZED DDG AND SOY MEAL |
| --- | --- | --- | --- | --- |
| 100° C. | 1.3 | 1.3 | 1.4 | 1.4 |
| 125° C. | 1.3 | 1.3 | 1.4 | 1.4 |
| 150° C. | 1.3 | 1.3 | 1.4 | 1.4 |

TABLE VII

Measurements of pellet tensile strength (MPa) as a function of composition and compression-molding temperature.

| TEM-PERATURE | OXIDIZED CORNCOB AND SOY ISOLATE | OXIDIZED DDG AND SOY ISOLATE | OXIDIZED CORNCOB AND SOY MEAL | OXIDIZED DDG AND SOY MEAL |
| --- | --- | --- | --- | --- |
| 100° C. | 3.3 |  | 5.1 | 2.8 |
| 125° C. | 7.6 | 3.2 | 6.6 | 4.0 |
| 150° C. | 7.1 |  | 3.5 | 2.8 |

What is claimed is:

1. A method for the preparation of biodegradable plastics, said method consisting essentially of:
   (I) providing a suspension in a basic aqueous carrier of a finely divided natural material containing a saccharide selected from the group consisting of
      (i) polysaccharides,
      (ii) oligosaccharides, and
      (iii) a combination of (i) and (ii);
   (II) adding water to the suspension;
   (III) agitating the suspension for a period of time;
   (IV) subjecting the product resulting from step (III) to a modifying material that converts any pendant hydroxyl group at any carbon atom of the anhydroglucose unit of the saccharide to a carboxylate, thereby forming a polysaccharide carboxylate, without breaking carbon—carbon bonds that form the ring of the anhydroglucose units of the saccharides, such modification selected from the group consisting of:
      (A) acylation using a material selected from the group consisting of cyclic anhydrides selected from the group consisting of
         (i) maleic anhydride,
         (ii) succinic anhydride,
         (iii) glutaric anhydride,
         (iv) phthalic anhydride and,
         (v) derivatives of (i), (ii), (iii), and (iv);
      (B) carboxymethylation using materials selected from the group consisting of:
         (i) haloalkanoic acids and
         (ii) salts of haloalkanoic acids, and,
      (C) oxidation using an oxidizing agent selected from the group consisting of:
         (a) hypochlorites;
         (b) hydrogen peroxide;
         (c) ozone and air, to provide a solid anionic material wherein pendant hydroxyl groups on any carbon atom of the anhydroglucose units of the saccharides are carboxylated and the carbon—carbon bonds that form the ring of the anhydroglucose units of the saccharide are not broken, and thereafter, (V) combining the material resulting from (IV) with a protein and allowing the resulting material and the protein to react with each other by forming interpolymeric electrostatic bonds between the protein and polysaccharide carboxylate molecules without the formation of strong, interpolymeric covalent bonds between the protein and polysaccharide molecules.

2. A plastic prepared by the method of claim 1.

3. A method as claimed in claim 1 wherein the natural material is selected from the group consisting of:
(i) starchy materials
(ii) cellulosic materials,
(iii) lignocellulosic materials,
(iv) hemicellulosic materials,
(v) plant gum containing materials,
(vi) polysaccharide-containing materials and,
(vii) oligosaccharide-containing materials.

4. A method as claimed in claim 1 wherein the natural material is selected from the group consisting of:

| | | |
|---|---|---|
| (i) plant tubers | (ii) wheat | (iii) seeds |
| (iv) shells of seeds | (v) stems | (vi) roots |
| (vii) leaves of plants | (vi) fruit | (vii) fruit skins |
| (viii) wood | (ix) tree branches | (x) tree bark |
| (xi) straw | (xii) grass | (xiii) distiller dry grain |
| (xiv) sugar beet pulp | (xv) cellulose pulp | (xvi) paper waste |
| (xvii) cotton | (xviii) linen | (xix) vegetables |
| (xx) vegetable skins. | | |

5. A method as claimed in claim 1 wherein the protein is selected from the group consisting of:

| | |
|---|---|
| (i) soy protein isolate, | (ii) casein separated from milk, |
| (iii) casein dispersed in milk, | (iv) whey protein isolate, |
| (v) whey protein, | (vi) potato protein, |
| (vii) ovalbumin, | (viii) animal albumins, |
| (ix) blood protein, and | (x) molasses raffinate. |

6. A method of preparing a moldable biodegradable plastic containing a copolymer of a polysaccharide and a protein through electrostatic bonding and not covalent bonding comprising:
a. forming a dispersion of fine particles of at least one polysaccharide in a basic pH aqueous solution,
b. converting pendant hydroxyl groups on carbon atoms of the anhydroglucose unit of the polysaccharide to polysaccharide carboxylate groups at a sufficiently low temperature and absence of chemicals such that the carbon—carbon bonds that form the ring of the anhydroglucose units of the polysaccharide are not broken, and
c. reacting the material from step b while at a basic pH with a protein in the absence of a reducing agent for said protein to form said moldable biodegradable plastic copolymer.

7. The method of claim 6 for the preparation of molded biodegradable plastics, said method consisting essentially of:
(I) providing a suspension in a basic aqueous carrier of a finely divided natural material containing a saccharide selected from the group consisting of
(i) polysaccharides,
(ii) oligosaccharides, and
(iii) a combination of (i) and (ii);
(II) adding water to the suspension;
(III) agitating the suspension for a period of time;
(IV) subjecting the product resulting from step (III) to a modifying material that converts pendant hydroxyl groups at any carbon atom of the anhydroglucose unit of the saccharide to carboxylates, thereby forming polysaccharide carboxylates without breaking carbon—carbon bonds that form the ring of the anhydroglucose units of the saccharides, such modification selected from the group consisting of:
(A) acylation using a material selected from the group consisting of cyclic anhydrides selected from the group consisting of
(i) maleic anhydride,
(ii) succinic anhydride,
(iii) glutaric anhydride,
(iv) phthalic anhydride and,
(v) derivatives of (i), (ii), (iii), and (iv);
(B) carboxymethylation using materials selected from the group consisting of:
(i) haloalkanoic acids and
(ii) salts of haloalkanoic acids, and,
(C) oxidation using an oxidizing agent selected from the group consisting of:
(a) hypochlorites;
(b) hydrogen peroxide;
(c) ozone and
(d) air, to provide a solid anionic material wherein pendant hydroxy groups on any carbon atom of the anhydroglucose units of the saccharides are carboxylated and the carbon—carbon bonds that form the ring of the anhydroglucose units of the saccharide are not broken, and thereafter,
(V) combining the material resulting from (IV) with a protein and allowing the resulting material and the protein to react with each other by forming interpolymeric electrostatic bonds between the protein and the polysaccharide carboxylate molecules without the formation of strong, interpolymeric covalent bonds between protein and polysaccharide molecules,
(VI) thereafter molding the product from (V), and
(VII) thereafter drying the molded product.

8. A plastic prepared by the method of claim 7.

9. The method as claimed in claim 6 wherein step a. of the method is carried out at room temperature.

10. The method as claimed in claim 7 wherein step III of the method is carried out at room temperature.

11. A method for the preparation of molded biodegradable plastics, said method of consisting essentially of:
(I) providing a suspension in a basic aqueous carrier of a finely divided natural material containing a saccharide selected from the group consisting of:
(i) polysaccharides,
(ii) oligosaccharides, and
(iii) a combination of (i) and (ii);
(II) adding water to the suspension;
(III) agitating the suspension for a period of time;
(IV) subjecting the product resulting from step (III) to a modifying material that converts pendant hydroxyl groups at any carbon atom of the anhydroglucose unit of the saccharide to carboxylates, thereby forming polysaccharide carboxylates without breaking carbon—carbon bonds that form the ring of the anhydroglucose units of the saccharides, such modification selected from the group consisting of:

(A) acylation using a material selected from the group consisting of cyclic anhydrides selected from the group consisting of
(i) maleic anhydride,
(ii) succinic anhydride,
(iii) glutaric anhydride,
(iv) phthalic anhydride and,
(v) derivatives of (i), (ii), (iii), and (iv);
(B) carboxymethylation using materials selected from the group consisting of:
(i) haloalkanoic acids and
(ii) salts of haloalkanoic acids, and,
(C) oxidation using an oxidizing agent selected from the group consisting of:
(a) hypochlorites;
(b) hydrogen peroxide;
(c) ozone and
(d) air, to provide a solid anionic material wherein pendant hydroxy groups on any carbon atom of the anhydroglucose units of the saccharides are carboxylated and the carbon—carbon bonds that form the ring of the anhydroglucose units of the saccharide are not broken, and thereafter,
(V) combining the material resulting from (IV) with a protein and allowing the resulting material and the protein to react with each other by forming interpolymeric electrostatic bonds between protein and polysaccharide carboxylate molecules without the formation of strong, interpolymeric covalent bonds between protein and polysaccharide molecules,
VI thereafter reducing the amount of water in (V) and,
(VII) thereafter molding the product from (VI), and
(VIII) thereafter drying the molded product from (VII).

12. A plastic prepared by the method of claim 11.

13. The method as claimed in claim 11 wherein step III of the method is carried out at room temperature.

* * * * *